US010485297B2

(12) United States Patent
Kodad

(10) Patent No.: US 10,485,297 B2
(45) Date of Patent: Nov. 26, 2019

(54) FLUID-FILLED CHAMBER WITH STITCHED TENSILE MEMBER

(71) Applicant: NIKE, Inc., Beaverton, OR (US)

(72) Inventor: Jay A. Kodad, Newberg, OR (US)

(73) Assignee: NIKE, Inc., Beaverton, OR (US)

( * ) Notice: Subject to any disclaimer, the term of this patent is extended or adjusted under 35 U.S.C. 154(b) by 383 days.

(21) Appl. No.: 15/214,981

(22) Filed: Jul. 20, 2016

(65) Prior Publication Data
US 2016/0324262 A1 Nov. 10, 2016

Related U.S. Application Data

(62) Division of application No. 14/068,391, filed on Oct. 31, 2013, now Pat. No. 9,427,043.

(51) Int. Cl.
*A43B 13/20* (2006.01)
*A43B 5/00* (2006.01)
*A43B 13/14* (2006.01)

(52) U.S. Cl.
CPC .............. *A43B 13/20* (2013.01); *A43B 5/00* (2013.01); *A43B 13/141* (2013.01)

(58) Field of Classification Search
CPC ......... A43B 13/20; A43B 13/141; A43B 5/00; A43B 13/189; A43B 13/203;
(Continued)

(56) References Cited

U.S. PATENT DOCUMENTS 500,385 A * 6/1893 Hall ...................... A43B 13/141
36/102
2,155,166 A 4/1939 Kraft
(Continued)

FOREIGN PATENT DOCUMENTS

CN 1037828 A 12/1989
CN 101370405 B 12/2010
(Continued)

OTHER PUBLICATIONS

European Patent Office, Extended European Search Report for EP Application No. 18162456.0, dated Jun. 18, 2018.
(Continued)

*Primary Examiner* — Jameson D Collier
*Assistant Examiner* — Jocelyn Bravo
(74) *Attorney, Agent, or Firm* — Honigman LLP; Matthew H. Szalach; Jonathan P. O'Brien

(57) ABSTRACT

A chamber for receiving a pressurized fluid may include a tensile member extending between a first chamber barrier layer and a second chamber barrier layer and including a plurality of tethers extending between the first tensile member layer and the second tensile member layer. The chamber may include stitching through the tensile member in a stitched region. When the chamber is pressurized with the pressurized fluid, a substantial majority of the first tensile member layer is separated from the second tensile member layer by a distance that corresponds to a length of the plurality of tethers. In addition, the first tensile member layer is held in contact with the second tensile member layer by the stitching in the stitched region, thereby forming an area of the chamber having a reduced thickness relative to adjacent portions of the chamber.

20 Claims, 30 Drawing Sheets

(58) Field of Classification Search
CPC ..... A43B 13/206; A43B 21/28; A43B 17/026; A43B 17/03; Y10T 428/231
USPC .............................................. 36/21, 28, 29
See application file for complete search history.

(56) References Cited

U.S. PATENT DOCUMENTS

| | | | |
|---|---|---|---|
| 2,224,590 A * | 12/1940 | Boivin | A43B 7/06 36/3 B |
| 3,087,261 A | 4/1963 | Russell | |
| 3,526,199 A | 9/1970 | Keats | |
| 4,012,854 A | 3/1977 | Berend et al. | |
| 4,129,951 A | 12/1978 | Petrosky | |
| 4,183,156 A | 1/1980 | Rudy | |
| 4,219,945 A | 9/1980 | Rudy | |
| 4,229,889 A | 10/1980 | Petrosky | |
| 4,391,048 A | 7/1983 | Lutz | |
| 4,414,760 A | 11/1983 | Faiella | |
| 4,603,493 A * | 8/1986 | Eston | A43B 7/141 36/28 |
| 4,610,099 A | 9/1986 | Signori | |
| 4,738,119 A * | 4/1988 | Zafred | A41D 13/0053 2/81 |
| 4,747,575 A * | 5/1988 | Putt | B64D 15/166 137/624.14 |
| 4,827,631 A | 5/1989 | Thornton | |
| 4,833,795 A | 5/1989 | Diaz | |
| 4,852,275 A | 8/1989 | Bianchini et al. | |
| 4,936,029 A * | 6/1990 | Rudy | A43B 13/203 36/153 |
| 4,970,807 A | 11/1990 | Anderie et al. | |
| 5,042,176 A * | 8/1991 | Rudy | A43B 13/203 36/153 |
| 5,083,361 A | 1/1992 | Rudy | |
| 5,084,988 A | 2/1992 | Berger | |
| 5,113,599 A * | 5/1992 | Cohen | A43B 17/035 36/114 |
| 5,379,533 A | 1/1995 | Swartz | |
| 5,543,194 A * | 8/1996 | Rudy | A43B 13/189 428/69 |
| 5,561,920 A | 10/1996 | Graham et al. | |
| 5,575,088 A | 11/1996 | Allen et al. | |
| 5,588,227 A * | 12/1996 | Goldston | A43B 1/0018 36/29 |
| 5,709,954 A | 1/1998 | Lyden et al. | |
| 5,713,141 A | 2/1998 | Mitchell et al. | |
| 5,733,647 A * | 3/1998 | Moore, III | A43B 7/144 36/43 |
| 5,767,412 A | 6/1998 | Goldston et al. | |
| D396,342 S | 7/1998 | Foxen et al. | |
| 5,784,808 A * | 7/1998 | Hockerson | A43B 13/181 36/102 |
| 5,952,065 A | 9/1999 | Mitchell et al. | |
| 5,987,781 A * | 11/1999 | Pavesi | A43B 13/20 36/29 |
| 6,013,340 A | 1/2000 | Bonk et al. | |
| 6,065,230 A * | 5/2000 | James | A43B 3/0057 36/25 R |
| 6,082,025 A | 7/2000 | Bonk et al. | |
| 6,115,945 A | 9/2000 | Ellis, III | |
| 6,119,371 A * | 9/2000 | Goodwin | A43B 7/144 36/29 |
| 6,127,026 A | 10/2000 | Bonk et al. | |
| 6,203,868 B1 | 3/2001 | Bonk et al. | |
| 6,266,897 B1 * | 7/2001 | Seydel | A43B 13/16 36/25 R |
| 6,321,465 B1 | 11/2001 | Bonk et al. | |
| 6,557,274 B2 | 5/2003 | Litchfield et al. | |
| 7,047,667 B2 * | 5/2006 | Klavano | A43B 1/0045 36/141 |
| 7,168,190 B1 * | 1/2007 | Gillespie | A43B 3/24 36/102 |
| 7,210,249 B2 | 5/2007 | Passke et al. | |
| 7,278,445 B2 | 10/2007 | Marvin et al. | |
| 7,752,772 B2 | 7/2010 | Hatfield et al. | |
| 7,943,225 B2 * | 5/2011 | McCormick | B32B 3/266 156/286 |
| 8,151,486 B2 | 4/2012 | Dua | |
| 8,220,071 B2 | 7/2012 | Rhoades et al. | |
| 8,241,450 B2 * | 8/2012 | Hensley | A43B 13/20 156/145 |
| 8,272,149 B2 | 9/2012 | Cooper et al. | |
| 8,479,412 B2 | 7/2013 | Peyton et al. | |
| 2003/0097767 A1 * | 5/2003 | Perkinson | A43B 7/1425 36/29 |
| 2003/0183324 A1 * | 10/2003 | Tawney | A43B 13/20 156/145 |
| 2005/0076536 A1 * | 4/2005 | Hatfield | A43B 3/0057 36/3 B |
| 2005/0097777 A1 * | 5/2005 | Goodwin | A43B 13/20 36/29 |
| 2005/0132608 A1 * | 6/2005 | Dojan | A43B 13/20 36/29 |
| 2005/0167029 A1 * | 8/2005 | Rapaport | A43B 13/187 156/145 |
| 2007/0006487 A1 | 1/2007 | Gallegos | |
| 2007/0051018 A1 | 3/2007 | Issler | |
| 2007/0063368 A1 | 3/2007 | Schindler | |
| 2007/0084083 A1 * | 4/2007 | Hazenberg | A43B 1/0018 36/29 |
| 2007/0094896 A1 | 5/2007 | Hatfield et al. | |
| 2007/0169376 A1 * | 7/2007 | Hatfield | A43B 7/1415 36/29 |
| 2007/0169379 A1 | 7/2007 | Hazenberg et al. | |
| 2007/0199211 A1 * | 8/2007 | Campbell | A43B 5/001 36/59 R |
| 2008/0229617 A1 | 9/2008 | Johnson et al. | |
| 2009/0151196 A1 | 6/2009 | Schindler et al. | |
| 2009/0288312 A1 | 11/2009 | Dua | |
| 2009/0288313 A1 * | 11/2009 | Rapaport | B29C 66/83221 36/29 |
| 2010/0024251 A1 * | 2/2010 | Delgatty | A43B 1/0027 36/101 |
| 2010/0199406 A1 | 8/2010 | Dua et al. | |
| 2011/0131831 A1 | 6/2011 | Peyton et al. | |
| 2012/0102782 A1 | 5/2012 | Swigart et al. | |
| 2012/0102783 A1 | 5/2012 | Swigart et al. | |
| 2012/0211147 A1 | 8/2012 | Rapaport et al. | |
| 2013/0263391 A1 | 10/2013 | Chao et al. | |
| 2013/0266773 A1 * | 10/2013 | Hazenberg | A43B 13/20 428/188 |
| 2014/0033570 A1 | 2/2014 | Peyton | |
| 2014/0053427 A1 | 2/2014 | Patton | |
| 2014/0182167 A1 | 7/2014 | James et al. | |
| 2014/0250729 A1 | 9/2014 | James et al. | |
| 2014/0259462 A1 * | 9/2014 | Taylor | A43B 13/20 12/146 R |
| 2014/0360046 A1 | 12/2014 | Dojan et al. | |
| 2015/0208759 A1 | 7/2015 | Hazenberg et al. | |

FOREIGN PATENT DOCUMENTS

| | | |
|---|---|---|
| CN | 103025188 A | 4/2013 |
| KR | 20110100190 A | 9/2011 |
| WO | WO-2007087495 A2 | 8/2007 |
| WO | WO-2013155086 A2 | 10/2013 |

OTHER PUBLICATIONS

Korean Intellectual Property Office, Office Action for KR Application No. 10-2016-7014425, dated Mar. 30, 2018.

State Intellectual Property Office, Chinese Office Action and Search Report for Application No. 201480059498.7, dated Dec. 21, 2016.

International Searching Authority, International Search Report and Written Opinion dated Dec. 4, 2014 in PCT/US2014/053358.

Korean Intellectual Property Office, Office Action for KR Application No. 10-2019-7003163, dated Apr. 27, 2019.

(56) References Cited

OTHER PUBLICATIONS

China National Intellectual Property Administration, The First Office Action for CN Application No. 201710585346.6, dated Jun. 21, 2019.

* cited by examiner

FLUID-FILLED CHAMBER WITH
STITCHED TENSILE MEMBER

CROSS REFERENCED TO RELATED APPLICATIONS

This application is a Divisional of U.S. patent application Ser. No. 14/068,391, filed Oct. 31, 2013, the entire contents of which are hereby incorporated by reference.

BACKGROUND

The present invention relates generally to fluid-filled chambers for use in the sole structure of an article of footwear.

Conventional articles of athletic footwear include two primary elements, an upper and a sole structure. The upper provides a covering for the foot that comfortably receives and securely positions the foot with respect to the sole structure. The sole structure is secured to a lower portion of the upper and is generally positioned between the foot and the ground. In addition to attenuating ground reaction forces (that is, providing cushioning) during walking, running, and other ambulatory activities, the sole structure may influence foot motions (for example, by resisting pronation), impart stability, and provide traction, for example. Accordingly, the upper and the sole structure operate cooperatively to provide a comfortable structure that is suited for a wide variety of athletic activities.

The upper is often formed from a plurality of material elements (for example, textiles, polymer sheets, foam layers, leather, synthetic leather) that are stitched or adhesively bonded together to define a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permit entry and removal of the foot from the void within the upper. In addition, the upper may include a tongue that extends under the lacing system to enhance adjustability and comfort of the footwear, and the upper may incorporate a heel counter.

The sole structure generally incorporates multiple layers: a sockliner, a midsole, and a ground-engaging outer member. The sockliner is a thin, compressible member located within the upper and adjacent to a plantar (that is, lower) surface of the foot to enhance footwear comfort. The midsole is secured to a lower surface of the upper and forms a middle layer of the sole structure. Many midsole configurations are primarily formed from a resilient polymer foam material, such as polyurethane (PU) or ethyl vinyl acetate (EVA), that extends throughout the length and width of the footwear. The midsole may also incorporate plates, moderators, and/or other elements that further attenuate forces, influence the motions of the foot, and/or impart stability, for example. The ground-engaging outer member may be fashioned from a durable and wear-resistant material (for example, rubber) that includes texturing to improve traction.

Further, the sole structure may include fluid-filled chambers to provide cushioning and stability. Upon inflation, such chambers experience pressure that is evenly distributed to all portions of the inner surface of the bladder material from which the chamber is formed. Accordingly, the tendency is for chambers, when inflated, to take on an outwardly rounded shape. For use as cushioning members in footwear, however, it is desirable to provide the chambers with a relatively flat form, to serve as a platform for receiving the sole of a foot of a wearer. Thus, to limit the expansion of the top and bottom portions of the chamber upon inflation, sole structures have been developed with chambers having one or more tensile structures that link the top portion of the chamber to the bottom portion of the chamber in order to maintain the chambers in a substantially planar configuration. However, such tensile members may provide increased stiffness to the chambers. Accordingly, there is a need for chamber configurations that provide tensile member-equipped fluid-filled chambers with increased flexibility.

SUMMARY

The present disclosure is generally directed to fluid-filled chamber configurations having tensile members including a top sheet bonded to a top barrier layer of the chamber, a bottom sheet bonded to a bottom barrier layer of the chamber, and a plurality of tethers extending between the top sheet and the bottom sheet. The outer barrier layers of the chamber, which retain the pressurized fluid, are bonded to the top sheet and the bottom sheet of the tensile member. The length of the tethers restricts the amount by which the outer barrier layers of the chamber may expand when the chamber is pressurized.

In order to provide the chamber with greater flexibility, portions of the tensile member may be stitched, thereby restricting the amount by which the top sheet and the bottom sheet in select portions of the tensile member separate upon pressurization of the chamber. Because the barrier layers are bonded to the tensile member, this configuration may form the chamber with a reduced thickness in the area in which the tensile member is stitched. Due to the reduced thickness, the area of the chamber having the reduced thickness may be more flexible than other portions of the chamber. For example, the reduced thickness may form a flex groove. Such flex grooves may be selectively located at various portions of the chamber corresponding with portions of the article of footwear sole structure that are desired to have greater flexibility, such as the ball of the foot.

In one aspect, the present disclosure is directed to a chamber for receiving a pressurized fluid. The chamber may include a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. In addition, the chamber may include a tensile member extending between the first chamber barrier layer and the second chamber barrier layer, the tensile member including a first tensile member layer bonded to the first chamber barrier layer, a second tensile member layer bonded to the second chamber barrier layer, and a plurality of tethers extending between the first tensile member layer and the second tensile member layer. Further, the chamber may include stitching through the tensile member in a stitched region. When the chamber is pressurized with the pressurized fluid, a substantial majority of the first tensile member layer is separated from the second tensile member layer by a distance that corresponds to a length of the plurality of tethers. In addition, the first tensile member layer is held in contact with the second tensile member layer by the stitching in the stitched region, thereby forming an area of the chamber having a reduced thickness relative to adjacent portions of the chamber.

In another aspect, the present disclosure is directed to a chamber for receiving a pressurized fluid. The chamber may include a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. In addition, the chamber may include a tensile member extending between the first chamber barrier layer and the second chamber barrier layer, the tensile member including a first tensile member layer bonded to the first chamber barrier layer, a second tensile member layer bonded to the second chamber barrier layer, and a plurality of tethers extending between the first tensile member layer and the second tensile member layer. Further, the chamber may include stitching through the tensile member in a stitched region. When the chamber is pressurized with the pressurized fluid, a substantial majority of the first tensile member layer is separated from the second tensile member layer by a distance that corresponds to a length of the plurality of tethers. In addition, the first tensile member layer is held at a second distance from the second tensile member layer by the stitching in the stitched region, thereby forming an area of the chamber having a reduced thickness relative to adjacent portions of the chamber. Further, the stitched region includes at least two elongate lines of stitching, including a first line of stitching and a second line of stitching arranged parallel and adjacent to the first line of stitching.

In another aspect, the present disclosure is directed to a chamber for receiving a pressurized fluid. The chamber may include a first chamber barrier layer and a second chamber barrier layer bonded to the first chamber barrier layer about peripheral portions of the first chamber barrier layer and the second chamber barrier layer to define an interior void between the first chamber barrier layer and the second chamber barrier layer. The chamber may also include a tensile member extending between the first chamber barrier layer and the second chamber barrier layer, the tensile member including a first tensile member layer bonded to the first chamber barrier layer, a second tensile member layer bonded to the second chamber barrier layer, and a plurality of tethers extending between the first tensile member layer and the second tensile member layer. Also, the chamber may include first stitching through the tensile member in a first stitched region and second stitching through the tensile member in a second stitched region. When the chamber is pressurized with the pressurized fluid, a substantial majority of the first tensile member layer is separated from the second tensile member layer by a distance that corresponds to a length of the plurality of tethers. In addition, the first tensile member layer is held a first distance from the second tensile member layer by the first stitching in the first stitched region, thereby forming a first area of the chamber having a first reduced thickness relative to adjacent portions of the chamber. Also, the first tensile member layer is held a second distance from the second tensile member layer by the second stitching in the second stitched region, thereby forming a second area of the chamber having a second reduced thickness relative to adjacent portions of the chamber, and the second distance is greater than the first distance.

In another aspect, the present disclosure is directed to a method of forming a chamber for receiving a pressurized fluid. The method may include providing a plurality of chamber components, including a first chamber barrier layer, a second chamber barrier layer, and a tensile member, the tensile member having a first tensile member layer, a second tensile member layer, and a plurality of tethers extending between the first tensile member and the second tensile member layer. The method may also include stitching through a portion of the tensile member, thereby drawing the first tensile member layer into contact with the second tensile member layer in a stitched area, and arranging the plurality of chamber components in a stacked arrangement. Further, the method may include arranging the chamber components in a stacked arrangement involves locating the tensile member between the first chamber barrier layer and the second chamber barrier layer and joining the chamber components to one another by applying pressure to the stacked arrangement of chamber components. The method may also include inflating the chamber with a pressurized fluid, the pressurized fluid expanding unstitched areas of the tensile member, applying tension to the plurality of tethers, wherein, in stitched areas of the tensile member, contact is maintained between the first tensile member layer and the second tensile member layer.

Other systems, methods, features and advantages of the current embodiments will be, or will become, apparent to one of ordinary skill in the art upon examination of the following figures and detailed description. It is intended that all such additional systems, methods, features and advantages be included within this description and this summary, be within the scope of the current embodiments, and be protected by the following claims.

BRIEF DESCRIPTION OF THE DRAWINGS

The invention can be better understood with reference to the following drawings and description. The figures are schematic representations of components of the disclosed invention. Accordingly, the components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
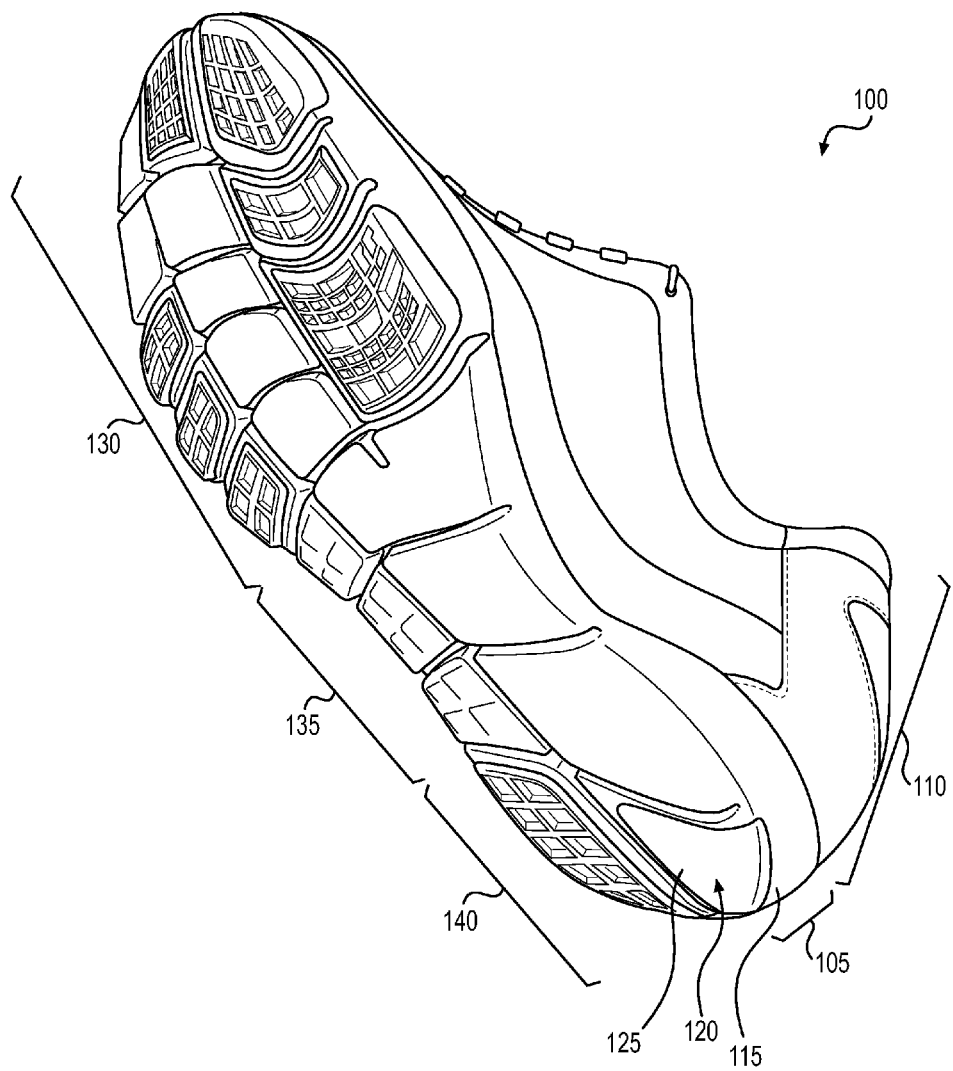
FIG. 1 shows a bottom perspective view of an article of footwear according to an exemplary embodiment.

The following discussion and accompanying figures disclose a sole structure for an article of footwear. Concepts associated with the footwear disclosed herein may be applied to a variety of athletic footwear types, including running shoes, basketball shoes, cross-training shoes, cricket shoes, golf shoes, soccer shoes, baseball shoes, cycling shoes, football shoes, golf shoes, tennis shoes, and walking shoes, for example. Accordingly, the concepts disclosed herein apply to a wide variety of footwear types.

For consistency and convenience, directional adjectives are employed throughout this detailed description corresponding to the illustrated embodiments. The term "longitudinal," as used throughout this detailed description and in the claims, refers to a direction extending a length of a sole structure, i.e., extending from a forefoot portion to a heel portion of the sole. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a sole. In other words, the lateral direction may extend between a medial side and a lateral side of an article of footwear, with the lateral side of the article of footwear being the surface that faces away from the other foot, and the medial side being the surface that faces toward the other foot.

The term "lateral axis," as used throughout this detailed description and in the claims, refers to an axis oriented in a lateral direction.

The term "horizontal," as used throughout this detailed description and in the claims, refers to any direction substantially parallel with the ground, including the longitudinal direction, the lateral direction, and all directions in between. Similarly, the term "side," as used in this specification and in the claims, refers to any portion of a component facing generally in a lateral, medial, forward, and/or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the foregoing directional terms, when used in reference to an article of footwear, shall refer to the article of footwear in an upright position, with the sole facing groundward as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, chemical or molecular bonding, and/or other joining techniques. In addition, two components may be "fixedly attached" by virtue of being integrally formed, for example, in a molding process.

FIG. 1 depicts an embodiment of an article of footwear 100, which may include a sole structure 105 and an upper 110 secured to sole structure 105. As shown in FIG. 1 for reference purposes, footwear 100 may be divided into three general regions, including a forefoot region 130, a midfoot region 135, and a heel region 140. Forefoot region 130 generally includes portions of footwear 100 corresponding with the toes and the joints connecting the metatarsals with the phalanges. Midfoot region 135 generally includes portions of footwear 100 corresponding with an arch area of the foot. Heel region 140 generally corresponds with rear portions of the foot, including the calcaneus bone. Forefoot region 130, midfoot region 135, and heel region 140 are not intended to demarcate precise areas of footwear 100. Rather, forefoot region 130, midfoot region 135, and heel region 140 are intended to represent general relative areas of footwear 100 to aid in the following discussion.

Since sole structure 105 and upper 110 both span substantially the entire length of footwear 100, the terms forefoot region 130, midfoot region 135, and heel region 140 apply not only to footwear 100 in general, but also to sole structure 105 and upper 110, as well as the individual elements of sole structure 105 and upper 110. Footwear 100 may be formed of any suitable materials. In some configurations, the disclosed footwear 100 may employ one or more materials disclosed in Lyden et al., U.S. Pat. No. 5,709,954, issued Jan. 20, 1998, the entire disclosure of which is incorporated herein by reference.

Upper 110 may include one or more material elements (for example, textiles, foam, leather, and synthetic leather), which may be stitched, adhesively bonded, molded, or otherwise formed to define an interior void configured to receive a foot. The material elements may be selected and arranged to selectively impart properties such as durability, air-permeability, wear-resistance, flexibility, and comfort. Upper 110 may alternatively implement any of a variety of other configurations, materials, and/or closure mechanisms.

Sole structure 105 may have a configuration that extends between upper 110 and the ground and may be secured to upper 110 in any suitable manner. For example, sole structure 105 may be secured to upper 110 by adhesive attachment, stitching, welding, or any other suitable method. Sole structure 105 may include provisions for attenuating ground reaction forces (that is, cushioning and stabilizing the foot during vertical and horizontal loading). In addition, sole structure 105 may be configured to provide traction, impart stability, and/or limit various foot motions, such as pronation, supination, and/or other motions.

The configuration of sole structure 105 may vary significantly according to one or more types of ground surfaces on which sole structure 105 may be used. For example, the disclosed concepts may be applicable to footwear configured for use on indoor surfaces and/or outdoor surfaces. The configuration of sole structure 105 may vary based on the properties and conditions of the surfaces on which footwear 100 is anticipated to be used. For example, sole structure 105 may vary depending on whether the surface is harder or softer. In addition, sole structure 105 may be tailored for use in wet or dry conditions, for example by varying the tread pattern and traction elements.

Sole structure 105 may include multiple components, which may individually and/or collectively provide footwear 100 with a number of attributes, such as support, rigidity, flexibility, stability, cushioning, comfort, reduced weight, traction, and/or other attributes. As shown in FIG. 1, sole structure 105 may include a ground-contacting outer member 120. In addition, in some embodiments, sole structure 105 may also include a midsole 115 disposed between outer member 120 and upper 110.

Outer member 120 may include an outer surface 125 exposed to the ground. Outer member 120 may be formed of suitable materials for achieving the desired performance attributes. For example, outer member 120 may be formed of any suitable polymer, composite, and/or metal alloy materials. Exemplary such materials may include thermoplastic and thermoset polyurethane, polyester, nylon, polyether block amide, alloys of polyurethane and acrylonitrile butadiene styrene, carbon fiber, poly-paraphenylene terephthalamide (para-aramid fibers, e.g., Kevlar®), titanium alloys, and/or aluminum alloys. In some embodiments, outer member 120 may be fashioned from a durable and wear-resistant material (for example, rubber). In some embodiments, outer member 120 may be formed of a compressible polymer foam material. Other suitable materials, including future-developed materials, will be recognized by those having skill in the art. Materials and configurations for outer member 120 may be selected according to the type of activity for which footwear 100 is configured.

In some embodiments, outer member may have a plurality of sipes extending upward and defining a plurality of sole elements. The plurality of sipes may provide the sole structure with increased flexibility. In some embodiments, the positions and orientations of the sipes may be selected to complement the natural motion of the foot during the running cycle. During the running cycle, as the heel leaves the ground, the foot rolls forward, loading the forefoot and the toes. In some embodiments, lateral sipes may be provided to increase longitudinal flexibility of the outer member of the sole structure. In some embodiments, longitudinal sipes may provide increased flexibility in a lateral direction. The increased flexibility in both the longitudinal direction and the lateral direction may allow the foot to flex in a more natural manner during contact with the ground. In addition, the siping may be configured to control, prevent, or limit certain foot motions. For example, in some embodiments, the siping may be configured to control pronation and/or supination.

Upper 110 and sole structure 105 may have structures that cooperatively flex, stretch, or otherwise move to provide an individual with a sensation of natural, barefoot running. That is, upper 110 and sole structure 105 may be configured to complement the natural motion of the foot during running or other activities. In contrast with barefoot running, however, sole structure 105 may attenuate ground reaction forces to decrease the overall stress upon the foot.

Figure 2:
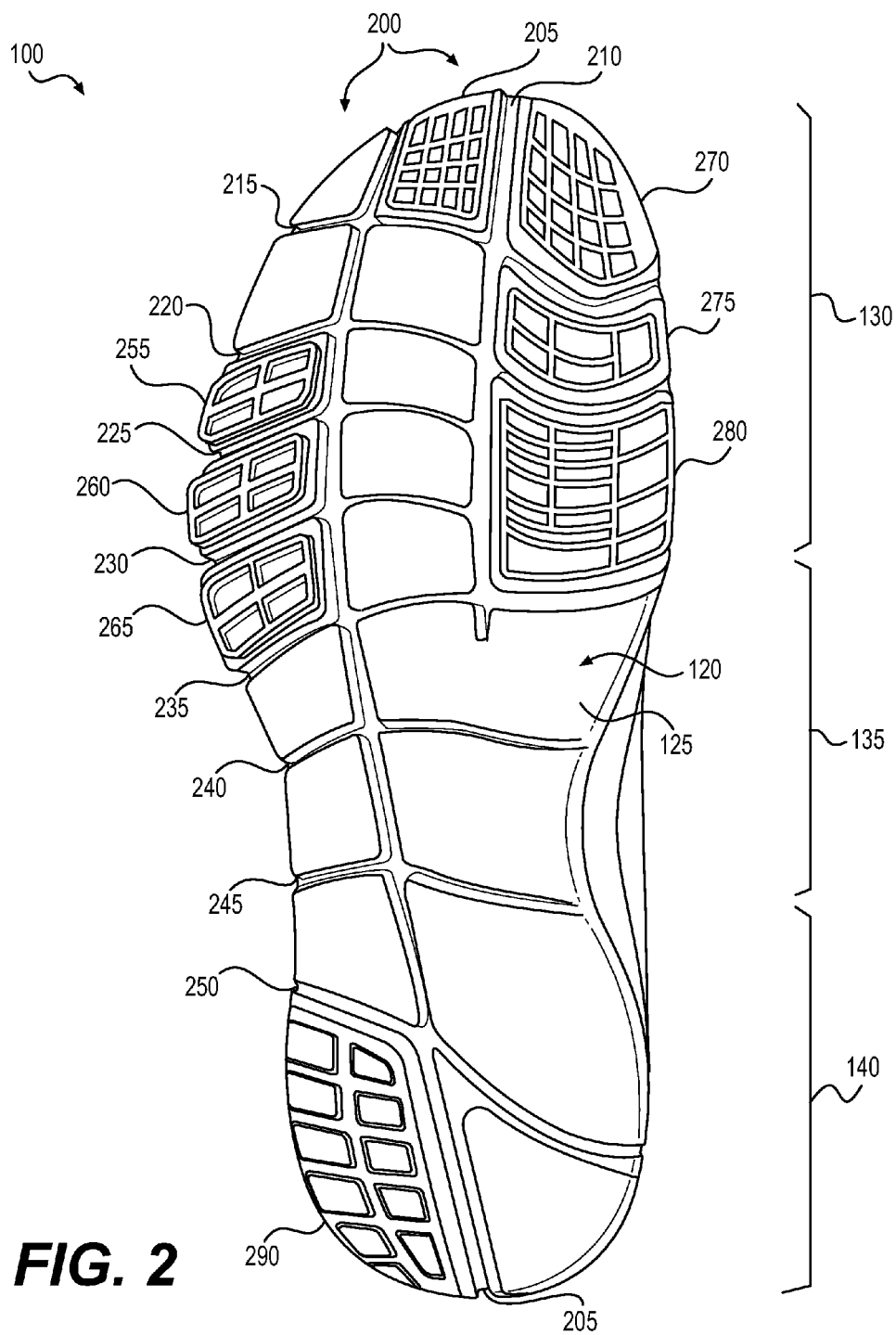
FIG. 2 shows a bottom view of the article of footwear shown in FIG. 1.

FIG. 2 shows a bottom view of footwear 100. As shown in FIG. 2, outer member 120 may include a plurality of sipes 200. For example, outer member 120 may include a laterally-located longitudinal sipe 205 and a medially-located longitudinal sipe 210. In some embodiments, laterally-located longitudinal sipe 205 may extend a full length of outer member 120, as shown in FIG. 2. In some embodiments, medially-located longitudinal sipe 210 may extend a partial length of outer member 120. For example, as shown in FIG. 2, medially-located longitudinal sipe 210 may extend longitudinally in forefoot region 130 of outer member 120. In some embodiments, laterally-located longitudinal sipe 205 and medially-located longitudinal sipe 210 may be substantially parallel to one another, as shown in FIG. 2.

Outer member 120 may include a plurality of laterally oriented sipes extending in substantially lateral directions. For example, as shown in FIG. 2, outer member 120 may include a first forefoot lateral sipe 215, a second forefoot lateral sipe 220, a third forefoot lateral sipe 225, a fourth forefoot lateral sipe 230, and a fifth forefoot lateral sipe 235. In addition, outer member 120 may include a first midfoot lateral sipe 240 and a second midfoot lateral sipe 245. Further, outer member 120 may include a heel region lateral sipe 250.

As shown in FIG. 2, the plurality of sipes may define a plurality of discreet sole elements. Outer member 120 may include various features configured to provide traction. For example, outer surface 125 may include a patterned tread, as shown in FIG. 2. In some embodiments, outer member 120 may include one or more tread members associated corresponding with the discreet sole elements defined by the plurality of sipes. In some embodiments, the tread members may be selectively located to provide traction at select portions of outer member 120. For example, as shown in FIG. 2, outer member 120 may include a first lateral tread member 255, a second lateral tread member 260, and a third lateral tread member 265. These tread members may provide traction during movements in which the lateral portion of the forefoot region of footwear 100 is substantially loaded.

As also shown in FIG. 2, outer member 120 may include a first medial tread member 270, a second medial tread member 275, and a third medial tread member 280. These tread members may provide traction during movements in which the medial portion of the forefoot region of footwear 100 is substantially loaded. In addition, outer member 120 may further include a toe region tread member 285, and a heel region tread member 290. On or more of first lateral tread member 255, second lateral tread member 260, third lateral tread member 265, first medial tread member 270, second medial tread member 275, third medial tread member 280, toe region tread member 285, and heel region tread member 290 may be formed of a material that provides more grip than other portions of outer member 120. For example, while a substantial majority of outer member 120 may be formed of a compressible foam material, the tread members may be formed of a rubber compound. Additionally, the tread members may have ground engaging features, such as projections or recesses, as shown in FIG. 2.

Figure 3:
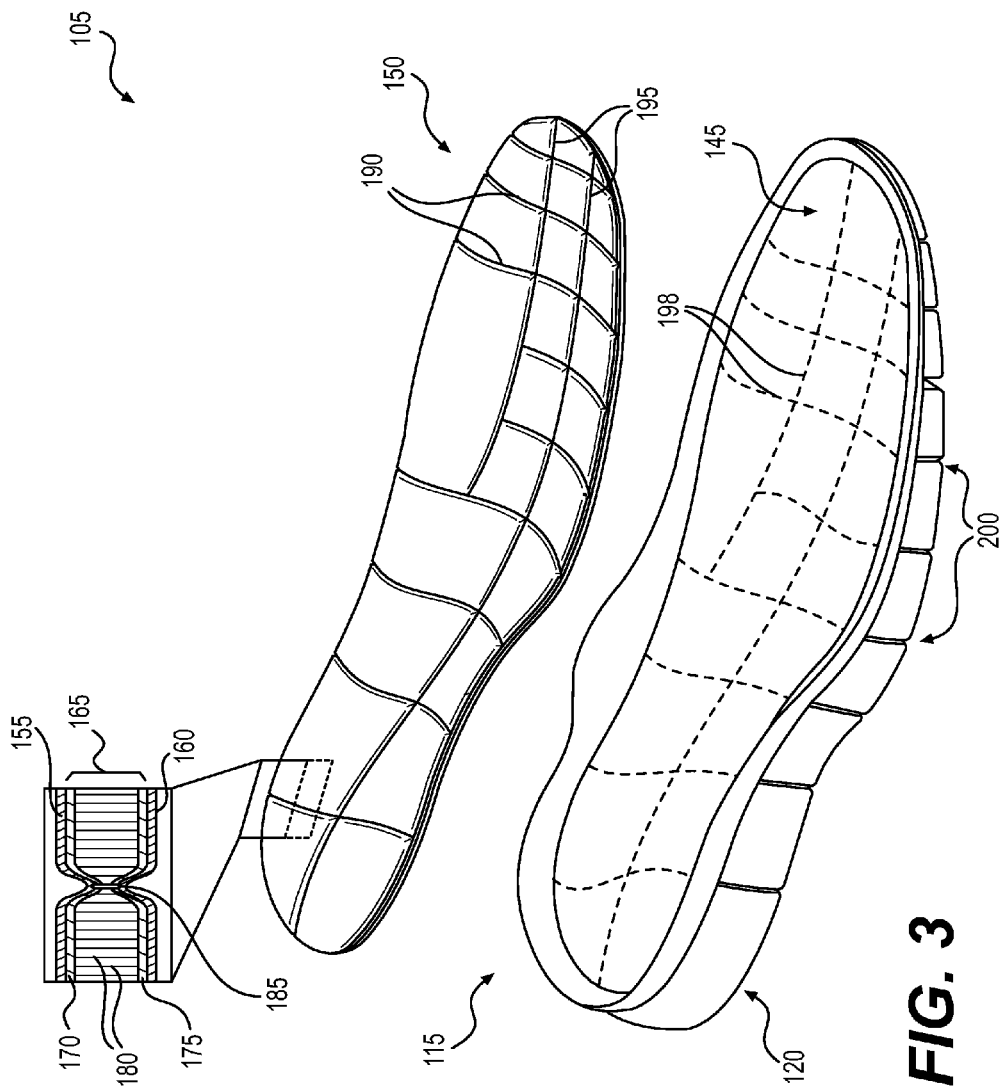
FIG. 3 shows an exploded perspective view of a sole structure of an article of footwear according to an exemplary embodiment.

FIG. 3 is an exploded view of sole structure 105. In some embodiments, sole structure 105 may include one or more additional components that control ground reaction forces. For example, in some embodiments, sole structure 105 may include a chamber 150 for receiving a pressurized fluid, such as one or more gases. Chamber 150 may be compressible, and thus, may provide cushioning by attenuating ground reaction forces. As shown in FIG. 3, in some embodiments, midsole 115 may include a recess 145 configured to receive and contain chamber 150.

In some embodiments, sole structure 105 may include an additional component on top of chamber 150. For example, sole structure 105 may include a footbed member (not shown). The footbed member may form a covering over top of chamber 150, to conceal chamber 150 from an inner portion of the article of footwear. In addition, the footbed member may provide a surface or footbed configured to support the foot of a wearer directly. In some embodiments, the footbed member may be removable. For example, in some embodiments, the footbed member may be a removable insole/sockliner. In other embodiments, the footbed member may be fixedly attached to one or more portions of the article of footwear. In some embodiments, the footbed member may be fixedly attached to midsole 115 about the periphery of recess 145, thereby enclosing chamber 150. In some embodiments, the footbed member may be a strobel. For example, the footbed member may be fixedly attached to an upper of the article of footwear. In such a strobel embodiment, the footbed member, when combined with the upper, may substantially completely enclose the foot of a wearer and isolate the wearer's foot from chamber 150. The footbed member may have any suitable configuration and any suitable material. For example, in some embodiments, the footbed member may be substantially incompressible. In such embodiments, the footbed member may be formed of rigid or semi-rigid materials such as hard plastics, carbon fiber, or other composite materials. In other embodiments, a substantially incompressible footbed member may be formed of a relatively flexible material, such as a textile, leather, or synthetic leather.

Midsole 115 may have any suitable configuration and may provide cushioning and stability. For example, in some embodiments, midsole 115 may be formed of a compressible material, such as a resilient polymer foam material, examples of which may include polyurethane (PU) or ethyl vinyl acetate (EVA). In some embodiments, midsole 115 may extend throughout the length and width of footwear 100. In some embodiments, midsole 115 may also incorporate incompressible plates, moderators, and/or other elements that further attenuate forces, influence the motions of the foot, and/or impart stability, for example.

As shown in the enlarged cross-sectional view in FIG. 3, chamber 150 may include a first chamber barrier layer 155 and a second chamber barrier layer 160. As shown in FIG. 3, in some embodiments, first chamber barrier layer 155 may be a top barrier layer and second chamber barrier layer 160 may be a bottom barrier layer. Second chamber barrier layer 160 may be bonded to first chamber barrier layer 155 about peripheral portions of first chamber barrier layer 155 and second chamber barrier layer 160 to define an interior void between first chamber barrier layer 155 and second chamber barrier layer 160.

The fluid within chamber 150 may range in pressure from zero to three-hundred-fifty kilopascals (i.e., approximately fifty-one pounds per square inch) or more. In some configurations of sole structure 105, a suitable pressure for the fluid may be a substantially ambient pressure. That is, the pressure of the fluid may be within five kilopascals of the ambient pressure of the atmospheric air surrounding footwear 100. The pressure of fluid within chamber 150 may be selected to provide desirable performance attributes. For example, higher pressures may provide a more responsive cushioning element, whereas lower pressures may provide more ground force attenuation (a softer cushion). The pressure of fluid within chamber 150 may be selected to work in concert with other cushioning elements of footwear 100, such as midsole 115 and footbed member 185.

In some configurations, chamber 150 may be inflated with substantially pure nitrogen. Such an inflation gas promotes maintenance of the pressure within chamber 150 through diffusion pumping, whereby the deficiency of other gases (besides nitrogen), such as oxygen, within chamber 150 biases the system for inward diffusion of such gasses into chamber 150. Further, bladder materials, such as those discussed above, may be substantially impermeable to nitrogen, thus preventing the escape of the nitrogen from chamber 150.

In some configurations, relatively small amounts of other gases, such as oxygen or a mixture of gasses, such as air, may be added to the nitrogen occupying most of the volume within chamber 150. In some configurations, chamber 150 may incorporate a valve that permits the individual to adjust the pressure of the fluid. In other configurations, chamber 150 may be incorporated into a fluid system, as disclosed in U.S. Pat. No. 7,210,249 to Passke, et al., as a pump chamber or a pressure chamber. In order to pressurize chamber 150 or portions of chamber 150, the general inflation methods disclosed in Hensley et al., U.S. Pat. No. 8,241,450, issued Aug. 14, 2012, and entitled "Method For Inflating A Fluid-Filled Chamber," and Schindler et al., U.S. Pat. No. 8,86, 408, issued Oct. 21, 2014, and entitled "Article Of Footwear Having A Sole Structure With A Fluid-Filled Chamber," may be utilized. The patents and published patent applications listed in this paragraph are incorporated herein by reference in their entirety.

In some embodiments, the chamber may include one or more features that limit the expansion of the top and bottom portions of the chamber upon inflation. For example, in some embodiments, the chamber may include one or more tensile structures that link the top portion of the chamber to the bottom portion of the chamber. Such tensile structures may be substantially inelastic (or may have a limited elasticity) such that, when the chamber is inflated causing the top and bottom portions of the chamber to be biased apart from one another, the tensile structures limit the distance by which the top and bottom portions may be separated during inflation. Accordingly, the tensile structures may enable the bladder to retain its intended, substantially planar shape.

As shown in FIG. 3, a tensile structure, such as a tensile member 165 may extend between first chamber barrier layer 155 and second chamber barrier layer 160. Tensile member 165 may be bonded to first chamber barrier layer 155 and second chamber barrier layer 160. For example, in some embodiments, a thermoplastic (hot melt) adhesive may be used to bond tensile member 165 to first chamber barrier layer 155 and second chamber barrier layer 160. Tensile member 165 may have a limited elasticity and, therefore, may limit the extent to which first chamber barrier layer 155 and second chamber barrier layer 160 may be expanded away from one another upon inflation of chamber 150.

As shown in FIG. 3, tensile member 165 may include a first tensile member layer 170 and a second tensile member layer 175. Further, tensile member 165 may also include a plurality of tethers 180 extending between first tensile member layer 170 and second tensile member layer 175.

Tensile member 165 may have any configuration suitable for limiting the distance between first chamber barrier layer 155 and second chamber barrier layer 160 of chamber 150 when inflated. For example, tensile member 165 may have any of the configurations disclosed in Dua, U.S. Pat. No. 8,151,486, issued Apr. 10, 2012, and entitled "Fluid-Filled Chamber with a Textile Tensile Member;" Peyton et al., U.S. Pat. No. 8,479,412, issued Jul. 9, 2013, and entitled "Tethered Fluid-Filled Chambers;" and Hazenberg et al., U.S. Patent Application Publication No. 2013/0266773, published Oct. 10, 2013, and entitled "Spacer Textile Materials and Methods for Manufacturing the Spacer Textile Materials," (U.S. patent application Ser. No. 13/443,421, filed Apr. 10, 2012) the entire disclosures of which are incorporated herein by reference.

In some configurations, tethers 180 may include a plurality of substantially planar slats. In some configurations, such slats may be arranged in a substantially vertical orientation. In other embodiments, such slats may be angled with respect to first chamber barrier layer 155 and second chamber barrier layer 160. Further, such slats may be oriented in any suitable direction. For example, in some embodiments, the slats may be oriented in a substantially lateral direction. In other embodiments, the slats may be oriented in a substantially longitudinal direction. Other orientations are also possible. Tethers 180 may have any of the planar configurations disclosed in Dua, U.S. Pat. No. 8,151,486, issued Apr. 10, 2012, and entitled "Fluid-Filled Chamber with a Textile Tensile Member."

In some configurations, tethers 180 may include a plurality of strand-like members having a substantially one-dimensional configuration. For example, tethers 180 may each have a length between first tensile member layer 170 and second tensile member 175. This length may be substantially greater than the width or thickness of the one-dimensional tethers. Tethers 180 may have any of the one-dimensional configurations disclosed in Peyton et al., U.S. Pat. No. 8,479,412, issued Jul. 9, 2013, and entitled "Tethered Fluid-Filled Chambers."

Tethers 180 may be formed of any suitable material. For example in some embodiments, tethers 180 may be formed of a polymer material. In some embodiments, tensile member 165 may be formed of a three-dimensional fabric (3-D fabric). Tensile member 165 may be formed as a unitary (i.e., one-piece) textile element having the configuration of a spacer-knit textile. A variety of knitting techniques may be utilized to form tensile member 165 and impart a specific configuration (e.g., taper, contour, length, width, thickness) to tensile member 165. In general, knitting involves forming courses and wales of intermeshed loops of a yarn or multiple yarns. In production, knitting machines may be programmed to mechanically-manipulate yarns into the configuration of tensile member 165. That is, tensile member 165 may be formed by mechanically-manipulating yarns to form a one-piece textile element that has a particular configuration. The two major categories of knitting techniques are weft-knitting and warp-knitting. Whereas a weft-knit fabric utilizes a single yarn within each course, a warp-knit fabric utilizes a different yarn for every stitch in a course. In some embodiments, tensile member 165 may be formed using double needle bar Raschel knitting. In some embodiments, tensile member 165 may be formed using configurations disclosed in Hazenberg et al., U.S. Patent Publication No. 2013/0266773, published Oct. 10, 2013, and entitled "Spacer Textile Materials and Methods for Manufacturing the Spacer Textile Materials," (U.S. patent application Ser. No. 13/443, 421, filed Apr. 10, 2012).

In some embodiments, all of tethers 180 may have substantially the same length, thus providing tensile member 165 with a substantially constant thickness. In other embodiments, tethers 180 may have different lengths. In some embodiments, first tensile member layer 170 and second tensile member layer 175 may each have a generally continuous and planar configuration. In some embodiments, first tensile member layer 170 and second tensile member layer 175 may be substantially parallel to one another. In other embodiments, tensile member 165 may have a tapered configuration. For example, in some embodiments, tensile member 165 may have a tapered configuration between heel region 140 and forefoot region 130. In order to impart the tapered configuration, the lengths of tethers 180 may decrease between the heel region and forefoot region of chamber 150. Exemplary tapered chamber configurations are disclosed in Dua, U.S. Pat. No. 8,151,486, issued Apr. 10, 2012, and entitled "Fluid-Filled Chamber with a Textile Tensile Member."

In some embodiments, one or both of first tensile member layer 170 and second tensile member layer 175 may have a contoured configuration. For example, in some embodiments, first tensile member layer 170 may have a concave configuration to conform to the anatomical shapes of the foot. A depression in heel region 140 may cradle the heel of a wearer and more evenly distribute contact forces between chamber 150 and the foot of the wearer. Exemplary contoured chamber configurations are disclosed in Dua, U.S. Pat. No. 8,151,486, issued Apr. 10, 2012, and entitled "Fluid-Filled Chamber with a Textile Tensile Member;" and Peyton et al., U.S. Pat. No. 8,479,412, issued Jul. 9, 2013, and entitled "Tethered Fluid-Filled Chambers."

In some embodiments, the chamber may include stitching through select portions of the tensile member in order to maintain the select portions of the tensile member in a collapsed configuration. This may provide the chamber with a reduced thickness, which may provide hinge-like flexibility in the stitched region. As shown in FIG. 3, stitching 185 may be stitched through tensile member 165. As shown in FIG. 3, first tensile member layer 155 remains continuous across multiple sections of chamber 150. Thus, tensile member 165 may be a fully pre-formed structure prior to assembly into chamber 150. Tensile member 165 being a fully pre-formed structure may facilitate positioning of tensile member 165 during assembly, because there are no separate pieces that may become out of place with respect to one another when pressed between first chamber barrier layer 155 and second chamber barrier layer 160.

Stitching 185 may be incorporated in chamber 150 in one or more stitched lines. For example, chamber 190 may include one or more laterally-oriented stitch lines 190. Additionally, or alternatively, chamber 190 may include one or more longitudinally-oriented stitch lines 195.

FIG. 3 illustrates sipes 200 with hidden lines 198 in recess 145. As shown in FIG. 3, in some embodiments, the stitch lines of chamber 150 may correspond to, and align with, sipes 200 in outer member 120. Exemplary configurations of stitching 185 are discussed in greater detail below.

Figure 4:
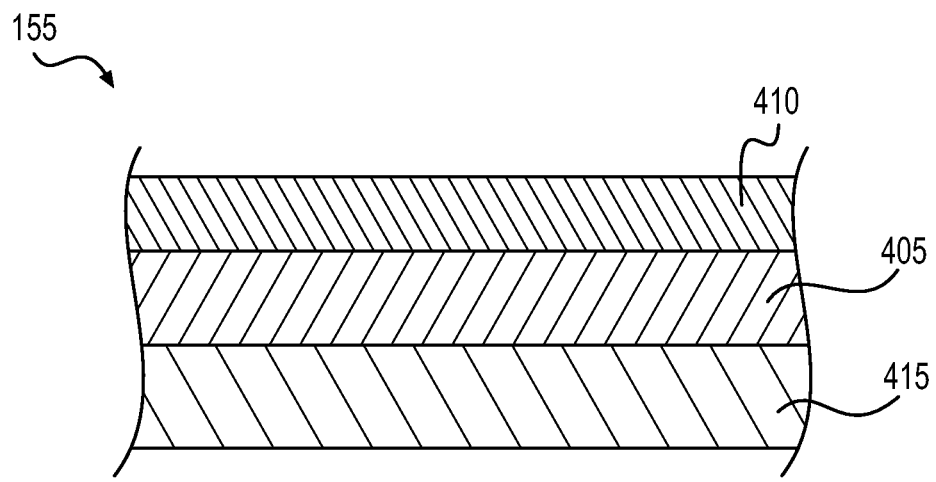
FIG. 4 is a cross-sectional view of a chamber barrier layer according to an exemplary embodiment.

FIG. 4 is a cross-sectional view of chamber barrier layer 155 according to an exemplary embodiment. Chamber barrier layers may be formed from a polymer or other bladder material that provides a sealed barrier for enclosing a fluid. As noted above, the bladder material may be transparent. A wide range of polymer materials may be utilized for chamber 150. In selecting materials for chamber 150, engineering properties of the material (e.g., tensile strength, stretch properties, fatigue characteristics, dynamic modulus, and loss tangent) as well as the ability of the material to prevent the diffusion of the fluid contained by chamber 150 may be considered. When formed of thermoplastic urethane, for example, the outer barrier of chamber 150 may have a thickness of approximately 1.0 millimeter, but the thickness may range from 0.25 to 2.0 millimeters or more, for example.

In addition to thermoplastic urethane, examples of polymer materials that may be suitable for chamber barrier layers include polyurethane, polyester, polyester polyurethane, and polyether polyurethane. Chamber barrier layers may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for chamber barrier layers is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and U.S. Pat. No. 6,321,465 to Bonk, et al. The patents listed in this paragraph are incorporated herein by reference in their entirety.

In some embodiments, the chamber barrier layers may be formed from a material that includes multiple layers. For example, in some embodiments, one or more of the chamber barrier layers may include alternating layers of thermoplastic polyurethane and ethylene-vinyl alcohol copolymer, as disclosed in U.S. Pat. Nos. 5,713,141 and 5,952,065 to Mitchell, et al., the entire disclosures of which are incorporated herein by reference. In some embodiments, each chamber barrier layer may have the alternating layered configuration. As depicted in FIG. 4, in some embodiments, chamber barrier layer 155 may include a first center layer 405, a second layer 410, and a third layer 415. First layer 405 may be disposed between second layer 410 and third layer 415. Further, first layer 405 may be joined to both second layer 405 and third layer 415.

In some embodiments, first layer 405 may be formed of a first material and second layer 410 may be formed of a second material. In some embodiments, third layer 415 may also be formed of the second material. Further, the second material may be different from the first material. In some embodiments, the first material may include an ethylene-vinyl copolymer. The second material may include a thermoplastic polymer. For example, in some embodiments, the thermoplastic polymer may be thermoplastic polyurethane.

Figure 5:
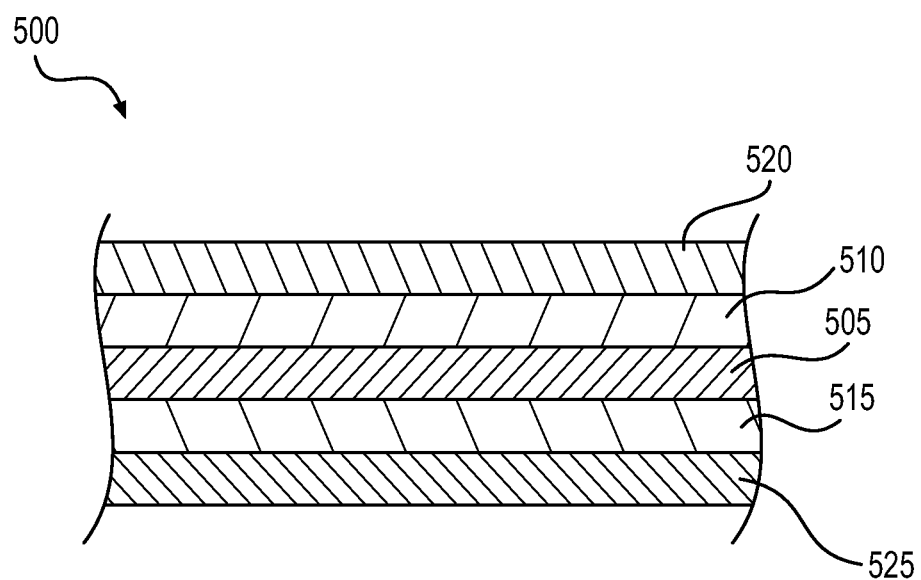
FIG. 5 is a cross-sectional view of a chamber barrier layer according to another exemplary embodiment.

FIG. 5 is a cross-sectional view of a chamber barrier layer according to another exemplary embodiment. In FIG. 5, a chamber barrier layer 500 may include 5 layers of material. For example, chamber barrier layer 500 may include a first center layer 505, a second layer 510, and a third layer 515. In some embodiments, first center layer 505, second layer 510, and third layer 515 may have configurations similar to corresponding layers discussed above with respect to FIG. 4. In addition, chamber barrier layer 500 may include a fourth layer 520 and a fifth layer 525. Second layer 510 may be disposed between fourth layer 520 and first layer 505. Further, second layer 505 may be joined to fourth layer 520. In addition, third layer 515 may be disposed between fifth layer 525 and first layer 505. Further, third layer 415 may be joined to fifth layer 425.

In some embodiments, fourth layer 520 may be formed of a third material and fifth layer 525 may also be formed of the third material. In some embodiments, the third material may be different than the second material. Further, the third material may also be different than the first material. In some embodiments, fourth layer 520 may be formed of a material that includes a regrind of thermoplastic polyurethane and ethylene-vinyl copolymer. Similarly, fifth layer 525 may also be formed of a material that includes a regrind of thermoplastic polyurethane and ethylene-vinyl copolymer.

Another suitable material for chamber barrier layers is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and U.S. Pat. No. 6,321,465 to Bonk, et al.

Figure 6:
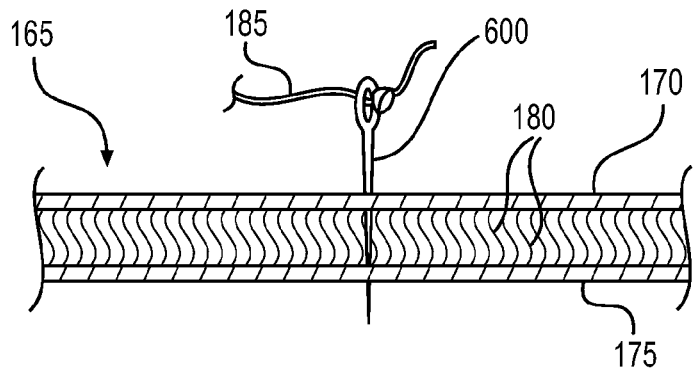
FIG. 6 is a cross-sectional view illustrating stitching of a tensile member according to an exemplary embodiment.

FIG. 6 is a cross-sectional view illustrating stitching of a tensile member according to an exemplary embodiment. As shown in FIG. 6, stitching 185 may be stitched through tensile member 165. In some embodiments, the stitching may be performed with a needle 185.

The stitching may include any suitable thread or other strand-like material. The stitching should have a tensile strength configured to prevent or limit the separation of the first tensile member layer from the second tensile member layer by the expansive forces applied by the pressurized fluid within the chamber. Any suitable material may be used for stitching the tensile member. In some embodiments, the stitching may be substantially inelastic. In other embodiments, the stitching may have a limited elasticity, allowing a predetermined amount of separation between the first tensile member layer and the second tensile member layer upon pressurization of the chamber.

In some embodiments, the stitching may include a monofilament strand. In some embodiments, the stitching may include a braided strand. In some embodiments, the stitching may include synthetic strand materials. For example, the stitching may include nylon, polyvinyledene fluoride (PVDF, aka fluorocarbon), polyethylene, Dacron, Dyneema (ultra high molecular weight poly ethylene (UHMWPE)), polyvinyl chloride (PVC), polyester, rayon (processed cellulose), or combinations thereof. In some embodiments, the stitching may include natural materials, such as cotton, silk, wool, or combinations thereof. In some embodiments, the stitching may include combinations of synthetic material and natural material.

The needle and thread shown in FIG. 6 are shown to schematically illustrate the stitching of the tensile member. In some embodiments, the tensile member may be stitched manually. In other embodiments, a machine may be used to stitch the tensile member. In some embodiments, the machine may be operated by a technician. In other embodiments, the machine may be semi-automated, or fully automated. For example, as discussed in greater detail below, the tensile member may be stitched in various patterns. Such patterned stitching may be performed with an automated machine. In some embodiments, the pattern may include one or more substantially straight lines. In some embodiments, the pattern may include one or more substantially curved lines. In some embodiments, the pattern may include both curved and straight lines of stitching. Further, in some embodiments, the pattern may include two or more lines of the stitching substantially adjacent one another. In some embodiments, the stitching may be embroidered.

Figure 7:
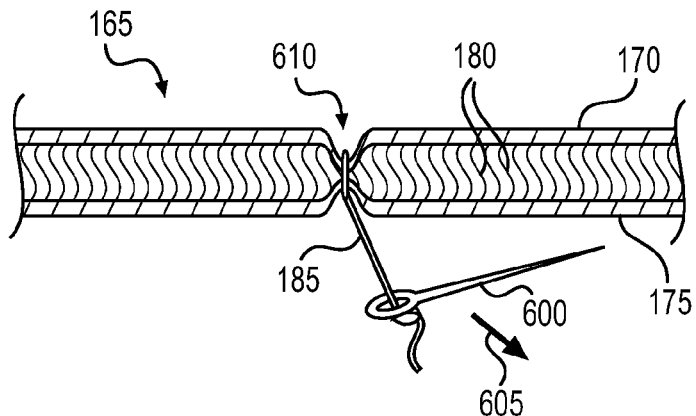
FIG. 7 is another cross-sectional view illustrating stitching of a tensile member according to an exemplary embodiment.

FIG. 7 is another cross-sectional view illustrating stitching of tensile member 165. As shown in FIG. 7, stitching 185 may be pulled tight, as illustrated by a first arrow 605 showing the pulling of stitching 185 by needle 600. As further shown in FIG. 7, the stitching through a portion of tensile member 165 may draw first tensile member layer 170 and second tensile member layer 175 toward one another in a stitched area. This may produce an area of reduced thickness 610 in tensile member 165. In some embodiments, the stitching may draw the tensile member layers into contact with one another.

It will be noted that FIG. 7 is a schematic illustration of the stitching process. The tightening of stitching 185 may be performed as part of the machine stitching process. Therefore, in some embodiments, the tightening may not necessarily be performed by pulling needle 600 in the direction of first arrow 605.

Figure 8:
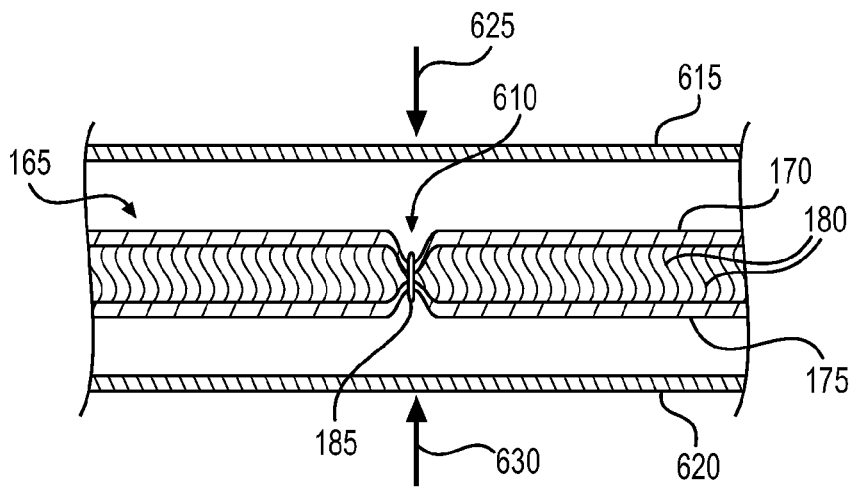
FIG. 8 is a cross-sectional view illustrating bonding of thermoplastic layers to a tensile member according to an exemplary embodiment.

In some embodiments, adhesive layers may be utilized to bond tensile member 165 to the chamber barrier layers. In some cases, such adhesive layers may be bonded to tensile member 165 after the stitching of tensile member 165 is performed. For example, FIG. 8 is a cross-sectional view illustrating bonding of thermoplastic layers to tensile member 165. As shown in FIG. 8, a first thermoplastic layer 615 may be placed adjacent to first tensile member layer 170 of tensile member 165. In addition, second thermoplastic layer 620 may be placed adjacent to second tensile member layer 170. This placement of these components may form a stacked arrangement. The stacked arrangement may be compressed in the direction of a second arrow 625 and a third arrow 630. In addition, heat may be applied to at least partially activate first thermoplastic layer 615 and second thermoplastic layer 620 to bond with tensile member 165.

Figure 9:
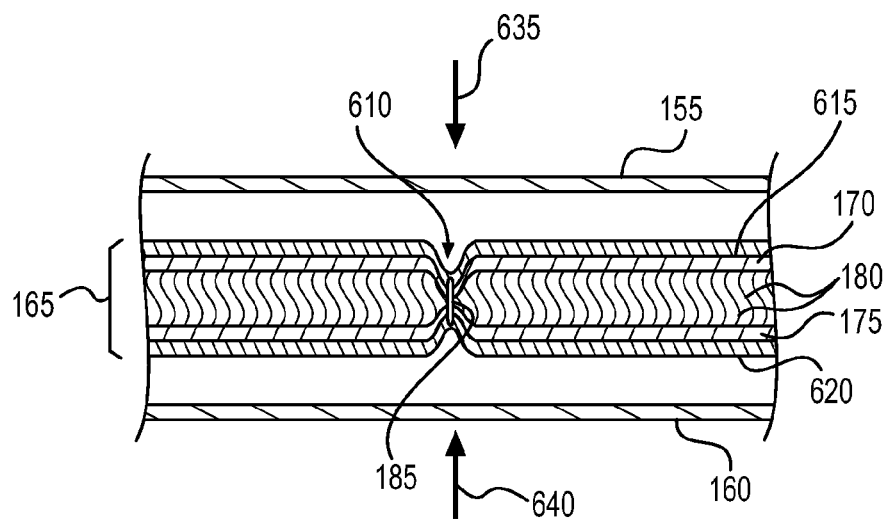
FIG. 9 is a cross-sectional view illustrating bonding of chamber barrier layers to a tensile member according to an exemplary embodiment.

FIG. 9 is a cross-sectional view illustrating bonding of chamber barrier layers to tensile member 165. As illustrated in FIG. 9, first chamber barrier layer 155, tensile member 165 and second chamber barrier layer 160 may be arranged in a stacked arrangement. That is, arranging the chamber components in a stacked arrangement involves locating tensile member 165 between first chamber barrier layer 155 and second chamber barrier layer 160. Once stacked, the components may be joined together by compression illustrated by a fourth arrow 635 and a fifth arrow 640. In addition to compression, heat may be applied to activate first thermoplastic layer 615 and second thermoplastic layer 620, to thereby thermally bond thermoplastic layer 615 to first tensile member layer 170 and second thermoplastic layer 620 to second tensile member layer 175.

Figure 10:
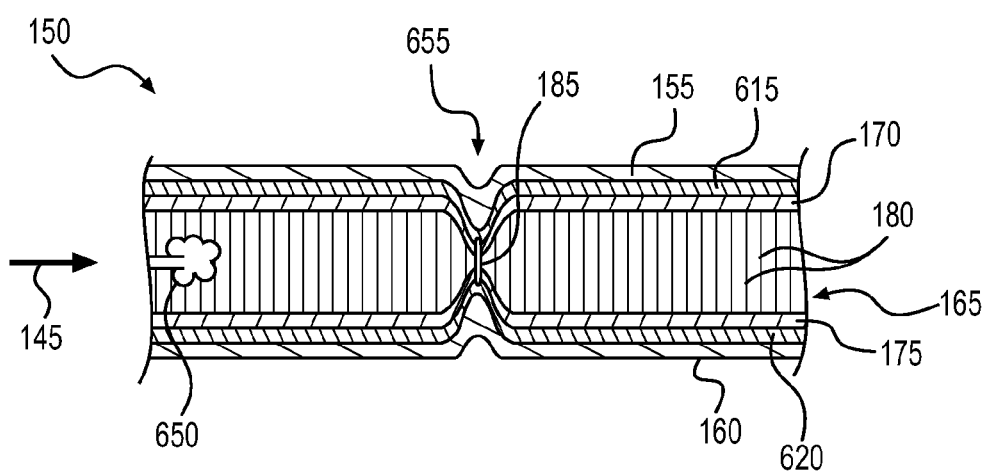
FIG. 10 is a cross-sectional view illustrating inflation of a chamber according to an exemplary embodiment.

Once peripheral portions of first chamber barrier layer 155 and second chamber barrier layer 160 are joined together to define a chamber, the chamber may be inflated. FIG. 10 is a cross-sectional view illustrating inflation of chamber 150 formed by the steps shown in FIGS. 6-9. As shown in FIG. 10, inflation gases may be injected into chamber 150 to pressurize chamber 150, as illustrated by a sixth arrow 645 and a billow of gas 650. Pressurizing chamber 150 may be performed to expand unstitched areas of tensile member 165. Accordingly, this will apply tension to tethers 180, as illustrated by tethers 180 shown in a straight configuration, as opposed to the curved configuration illustrated in FIGS. 6-9. In a stitched area 655, first tensile member layer 170 and second tensile member layer 175 may be held closer to one another than in unstitched areas of tensile member 165. In some embodiments, a gap may remain between first tensile member layer 170 and second tensile member layer 175 in stitched area 655, as shown in FIG. 10. In other embodiments, in stitched areas of the tensile member, contact may be maintained between the first tensile member layer and the second tensile member layer.

Figure 11:
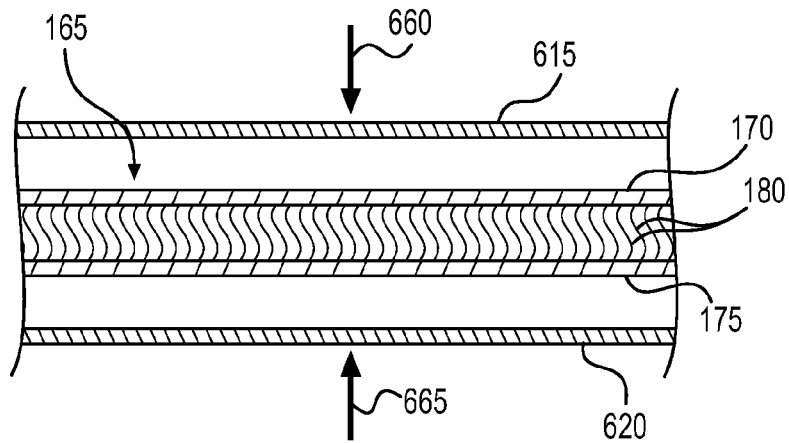
FIG. 11 is a cross-sectional view illustrating bonding of thermoplastic layers to a tensile member according to an exemplary embodiment.
Figure 12:
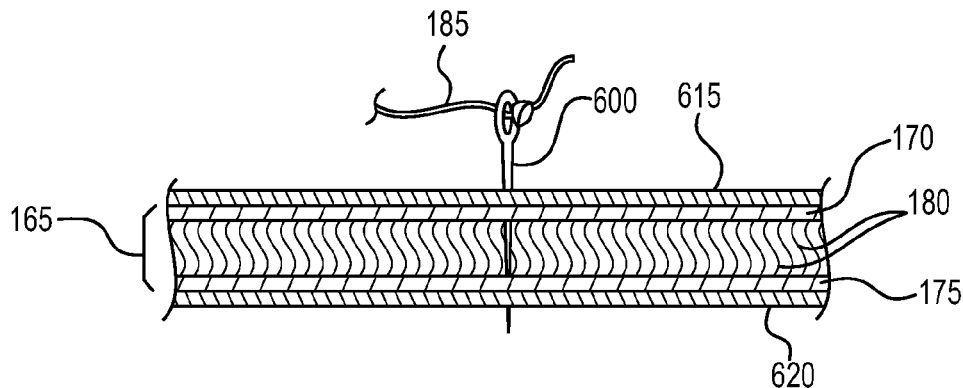
FIG. 12 is a cross-sectional view illustrating stitching of a tensile member according to an exemplary embodiment.

In some embodiments, the adhesive layers may be bonded to the tensile member prior to stitching of the tensile member. Once the adhesive layers are bonded to the tensile member, the stitching may be passed through the tensile member and the adhesive layers. FIGS. 11-15 illustrate a similar process of forming chamber 150 as shown in FIGS. 6-10, except that, as shown in FIG. 11, first thermoplastic layer 615 and second thermoplastic layer 620 may be bonded to tensile member 165 prior to stitching. As shown in FIG. 12, needle 600 may pass stitching 185 through not only tensile member 165 but also through first thermoplastic layer 615 and second thermoplastic layer 620.

Figure 13:
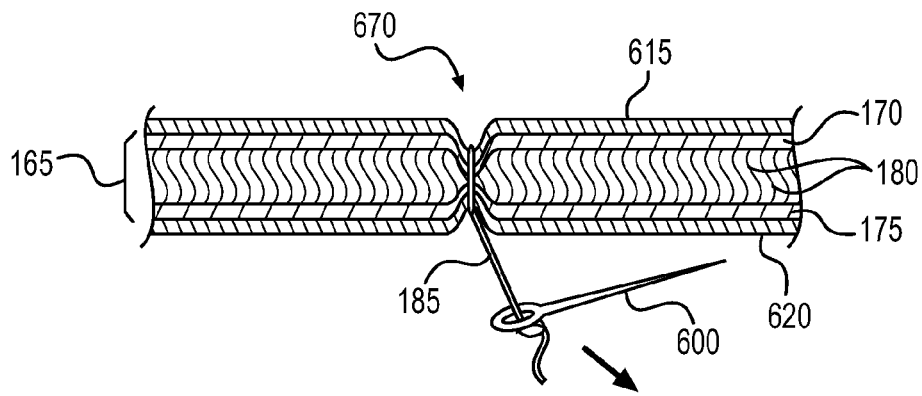
FIG. 13 is another cross-sectional view illustrating stitching of a tensile member according to an exemplary embodiment.
Figure 14:
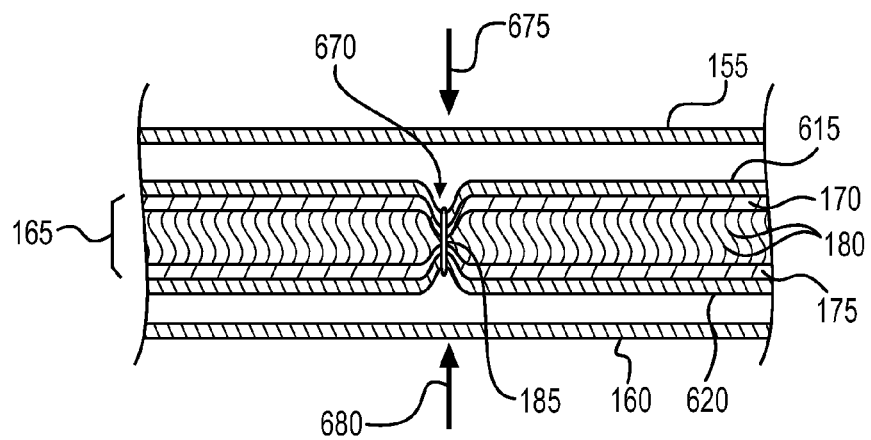
FIG. 14 is a cross-sectional view illustrating bonding of chamber barrier layers to a tensile member according to an exemplary embodiment.
Figure 15:
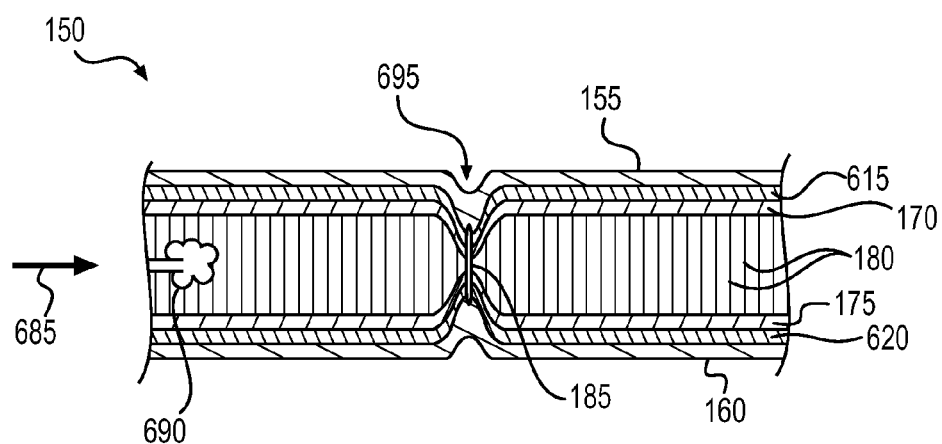
FIG. 15 is a cross-sectional view illustrating inflation of a chamber according to an exemplary embodiment.

As shown in FIG. 13, upon tightening stitching 185, an area of reduced thickness 670 in tensile member 165 may be formed. FIG. 14 illustrates the bonding of first chamber barrier layer 155 and second chamber barrier layer 160 by applying pressure indicated by a seventh arrow 675 and an eighth arrow 680. Heat may also be applied to activate first thermoplastic layer 615 and second thermoplastic layer 620. Finally, as indicated by ninth arrow 685 and a billow 690 in FIG. 15, chamber 150 may be inflated with pressurized gasses. As shown in FIG. 15, stitching 185 may provide chamber 150 with a reduced thickness in a stitched area 695.

A method of forming an article of footwear may include incorporating a chamber formed in the manner discussed above into the sole structure of the article of footwear. In some embodiments, stitching may include forming an elongate stitched region. In some cases, the sole structure of the article of footwear may includes at least one flex groove, and incorporating the chamber into the sole structure includes aligning the elongate stitched region with the at least one flex groove.

In some embodiments, stitching through a portion of the tensile member includes forming a stitched region by stitching a first line of stitching and a second line of stitching parallel and adjacent to the first line of stitching. This may provide a wider hinge in the chamber, which may provide varying performance in terms of flexibility.

In some embodiments, pressurizing the chamber with the pressurized fluid expands the first tensile member such that a substantial majority of the first tensile member layer is separated from the second tensile member layer by a distance that corresponds to a length of the plurality of tethers. In some embodiments, a first area of the chamber corresponding with the first stitched region has a first reduced thickness relative to adjacent portions of the chamber. Further, upon inflation of the chamber, the first tensile member layer is held a distance from the second tensile member layer by stitching in the second stitched region, thereby forming a second area of the chamber having a second reduced thickness relative to adjacent portions of the chamber.

Figure 16:
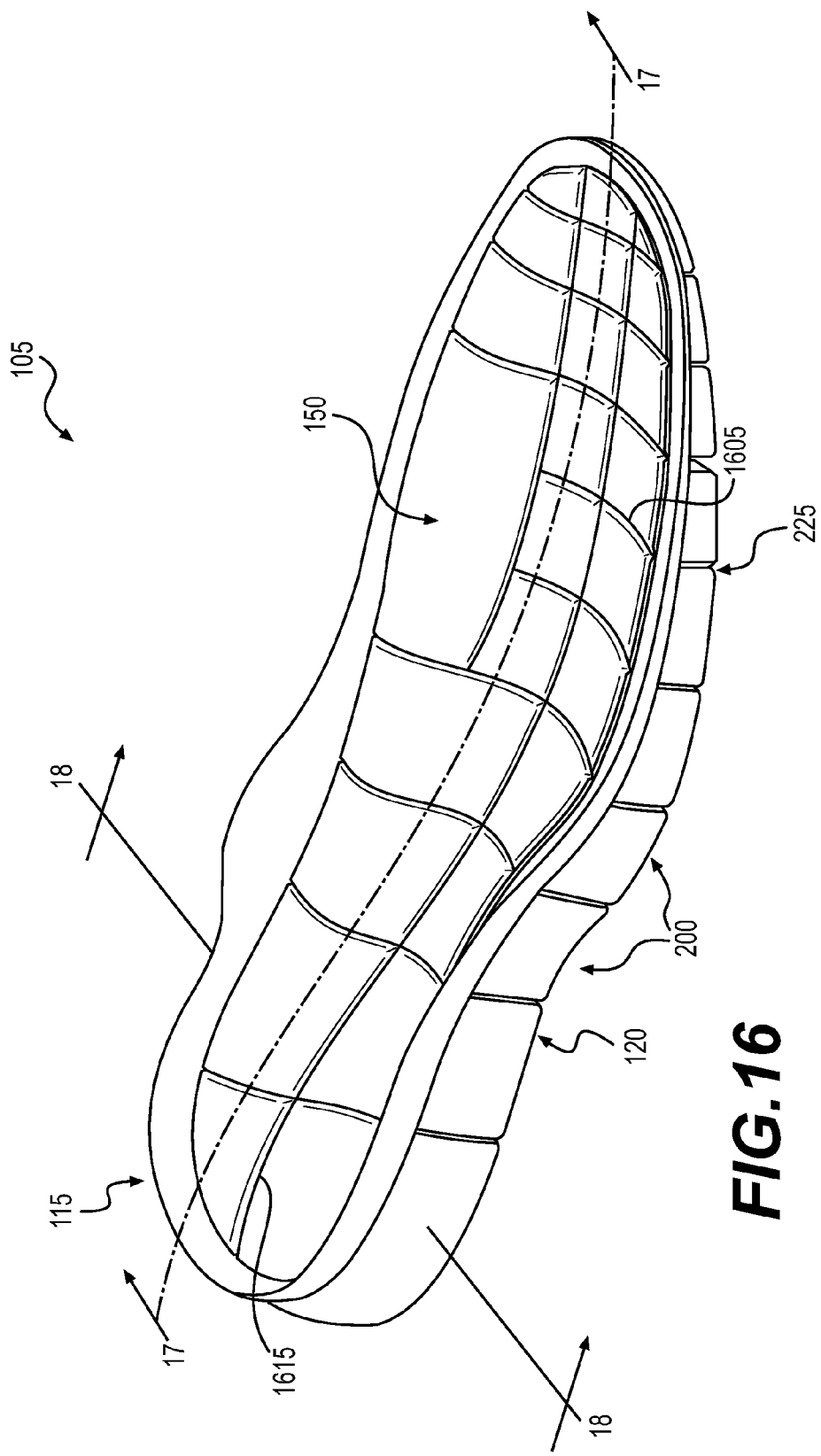
FIG. 16 is a perspective view of an assembled sole structure of an article of footwear according to an exemplary embodiment.

FIG. 16 is an assembled view of sole structure 105. As shown in FIG. 16, chamber 150 may be incorporated into sole structure 105 of the article of footwear. As further shown in FIG. 16, the stitch lines of chamber 150 may be aligned with sipes 200 of outer member 120 of sole structure 105. For example, chamber 150 may include a stitch line 1605 that is aligned with sipe 225, as shown in FIG. 16.

Figure 17:
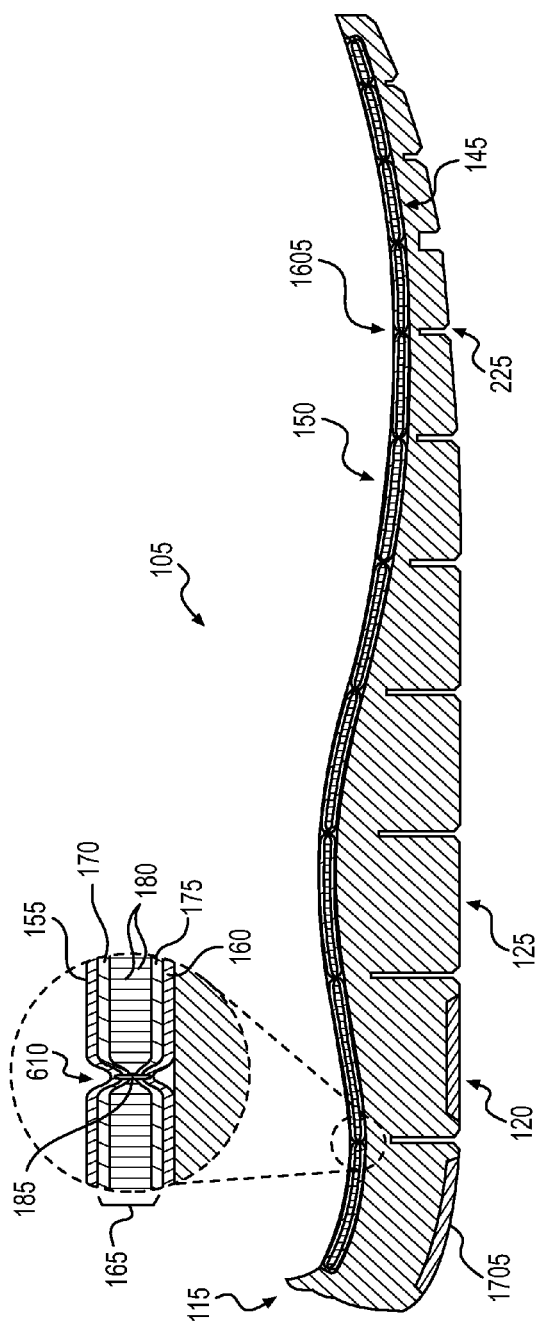
FIG. 17 is a cross sectional view taken at section line 17-17 in FIG. 16.
Figure 18:
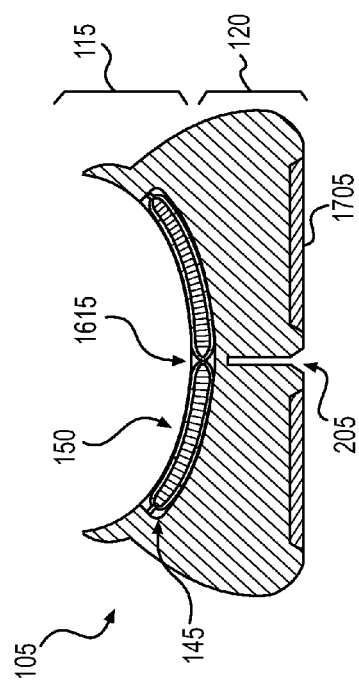
FIG. 18 is a cross sectional view taken at section line 18-18 in FIG. 16.

FIGS. 17 and 18 illustrate cross-sectional views taken through sole structure 105 shown in FIG. 16. In particular, FIG. 17 is a cross sectional view taken at section line 17-17 in FIG. 16. FIG. 17 illustrates chamber 150 disposed in recess 145. FIG. 17 also shows outer member 120, including a tread member 1705. FIG. 17 further shows area of reduced thickness 610 in chamber 150 in an enlarged view.

As shown in FIG. 17, the sipes in outer member 120 form a plurality of flex grooves in outer member 120. In some embodiments, the flex grooves may be aligned with stitched regions of chamber 150. For example, as shown in FIG. 17, stitch line 1605 may be aligned with sipe 225. By aligning the stitch lines and the flex grooves, the flexible portions of each component may be aligned, thus allowing for more overall flexibility of sole structure 105 than if the stitch lines and sipes were non-aligned.

FIG. 18 is a cross sectional view taken at section line 18-18 in FIG. 16. As shown in FIG. 18, a longitudinal stitch line 1615 may be aligned with sipe 205. This arrangement may provide increased lateral flexibility in sole structure 105 than if the stitch line and sipe were non-aligned. In some embodiments, the flex groove and the stitched region may be disposed in a forefoot region of the article of footwear, in a location that corresponds with a ball of a foot of a wearer of the article of footwear.

Figure 19:
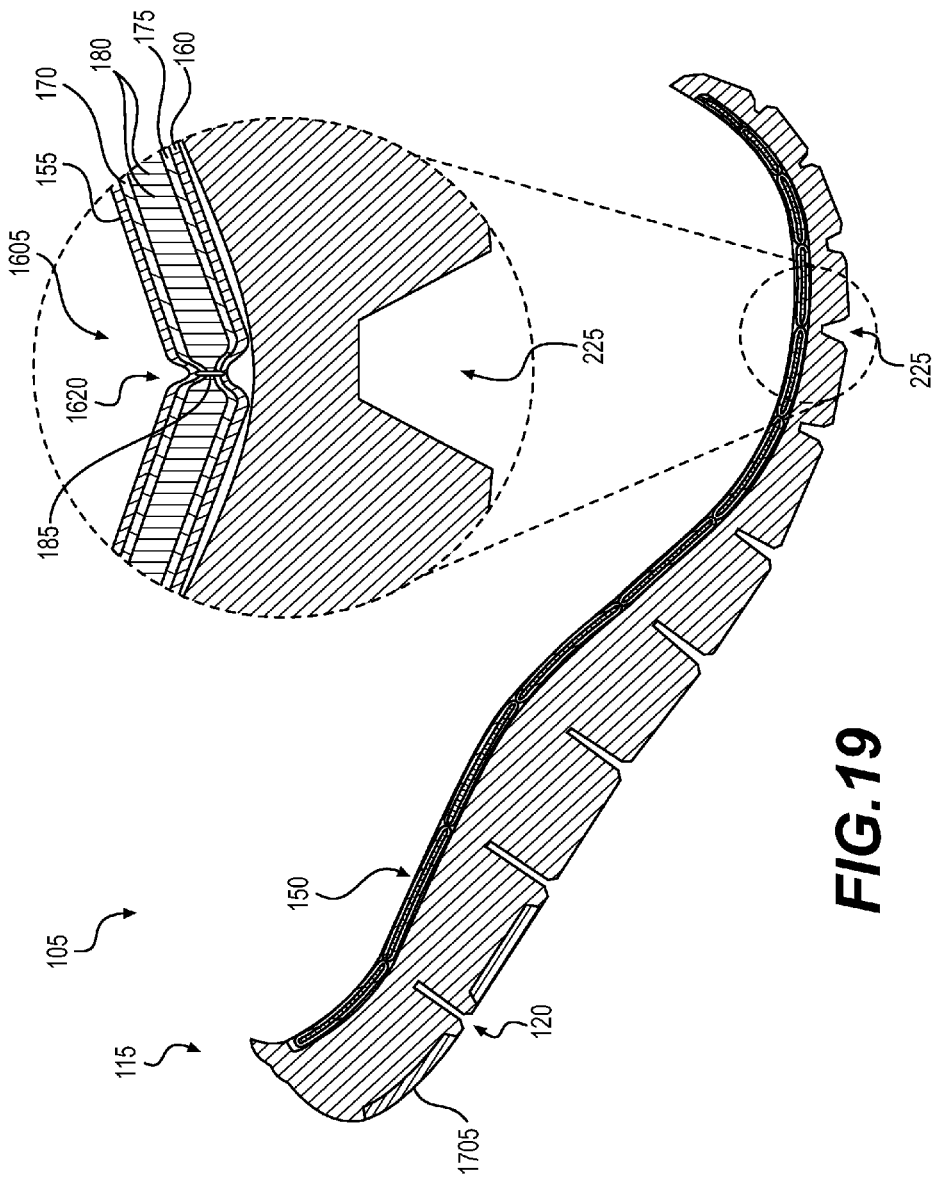
FIG. 19 is a cross sectional view illustrating the sole structure shown in FIG. 17 in an articulated configuration.

FIG. 19 is a cross sectional view illustrating the sole structure shown in FIG. 17 in an articulated configuration. FIG. 19 illustrates the forefoot region of sole structure 105 being curved upward as it may be when the wearer's heel is raised off the ground. As shown in FIG. 19, sipe 205 may open wider to form a more open flex groove upon articulation of sole structure 105. Stitch line 1605 of chamber 150 may form a hinge region 1620, which may articulate along with outer member 120. That is, as shown in FIG. 19, when chamber 1340 is articulated, adjacent sections of chamber 150 may hingedly rotate with respect to one another about the hinged region 1620.

In some embodiments, stitching in the chamber may be incorporated in patterns that provide the chamber with varying properties throughout its structure. For example, in some embodiments, stitch lines may be located at select distances or arrangements with respect to one another in order to provide the chamber with different flexibilities in different portions of the chamber. Providing the chamber with varying levels of flexibility may increase the correlation between the flexibility of the sole structure of the footwear and the wearer's foot.

Figure 20:
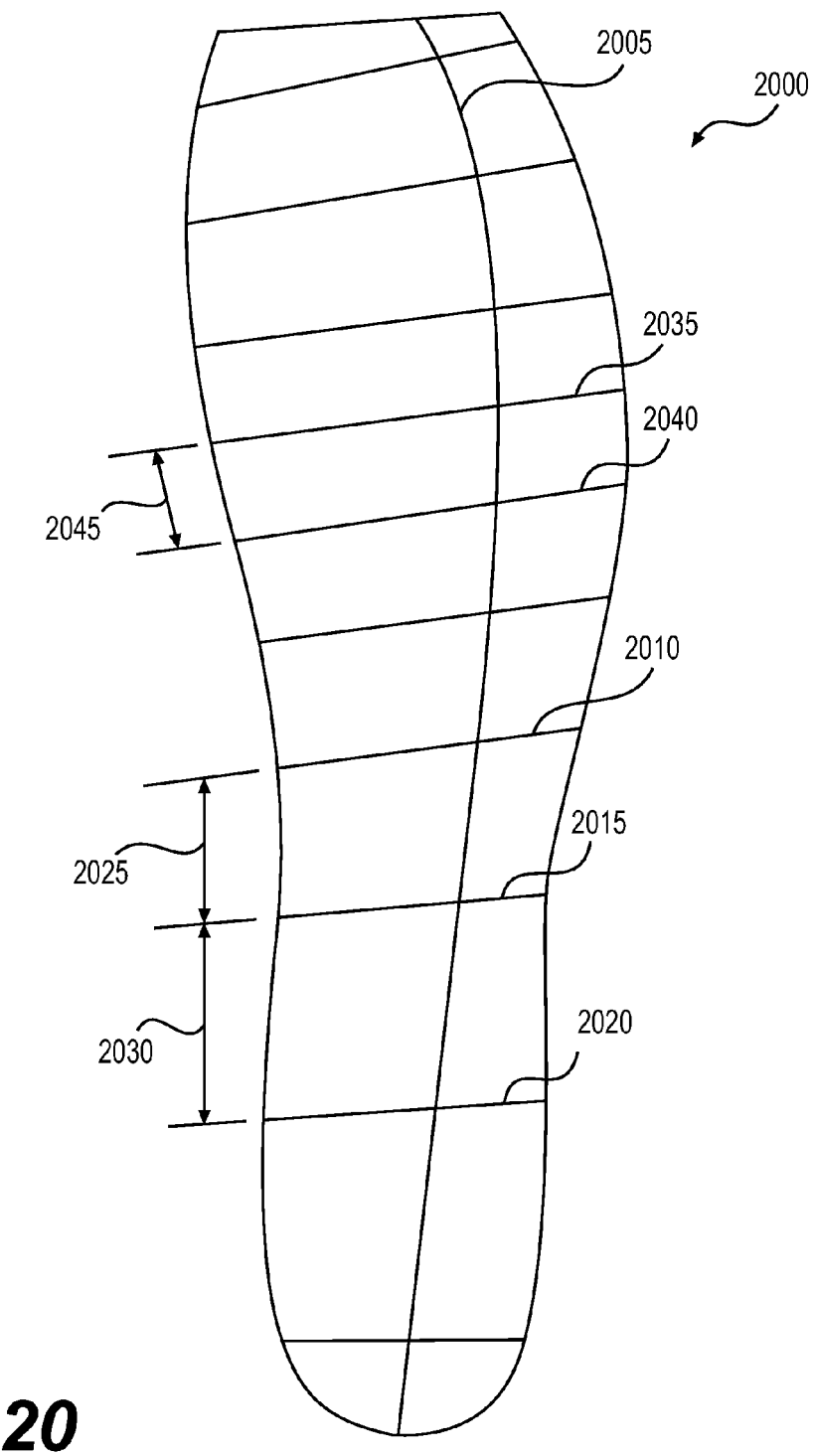
FIG. 20 illustrates a stitching pattern for a chamber for an article of footwear according to an exemplary embodiment.

FIG. 20 illustrates a stitching pattern for a chamber for an article of footwear according to an exemplary embodiment. As shown in FIG. 20, a chamber 2000 may include a stitched region. In some embodiments, the stitched region may include a longitudinal line of stitching 2005. In some embodiments, the stitched region may include a first line of stitching 2010, a second line of stitching 2015 substantially parallel to first line of stitching 2010, and a third line of stitching 2020 substantially parallel to first line of stitching 2010 and second line of stitching 2015. As shown in FIG. 20, second line of stitching 2015 may be spaced from first line of stitching 2010 by a first distance 2025. Further, third line of stitching 2020 may be spaced from second line of stitching 2015 by a second distance 2030. In some cases, first distance 2025 may be different than second distance 2030.

In some embodiments, a first region of chamber 2000 including first line of stitching 2010 and second line of stitching 2015 may have a first degree of flexibility. In addition, a second region of chamber 2000 including second line of stitching 2015 and third line of stitching 2020 may have a second degree of flexibility that is different than the first degree of flexibility of the first region of chamber 2000.

In addition, in some embodiments, chamber 2000 may include a fourth line of stitching 2035 and a fifth line of stitching 2040. Fourth line of stitching 2035 and fifth line of stitching 2040 may be disposed at a third distance 2045 from one another. In some embodiments, third distance 2045 may be different than first distance 2025 and second distance 2030.

Figure 21:
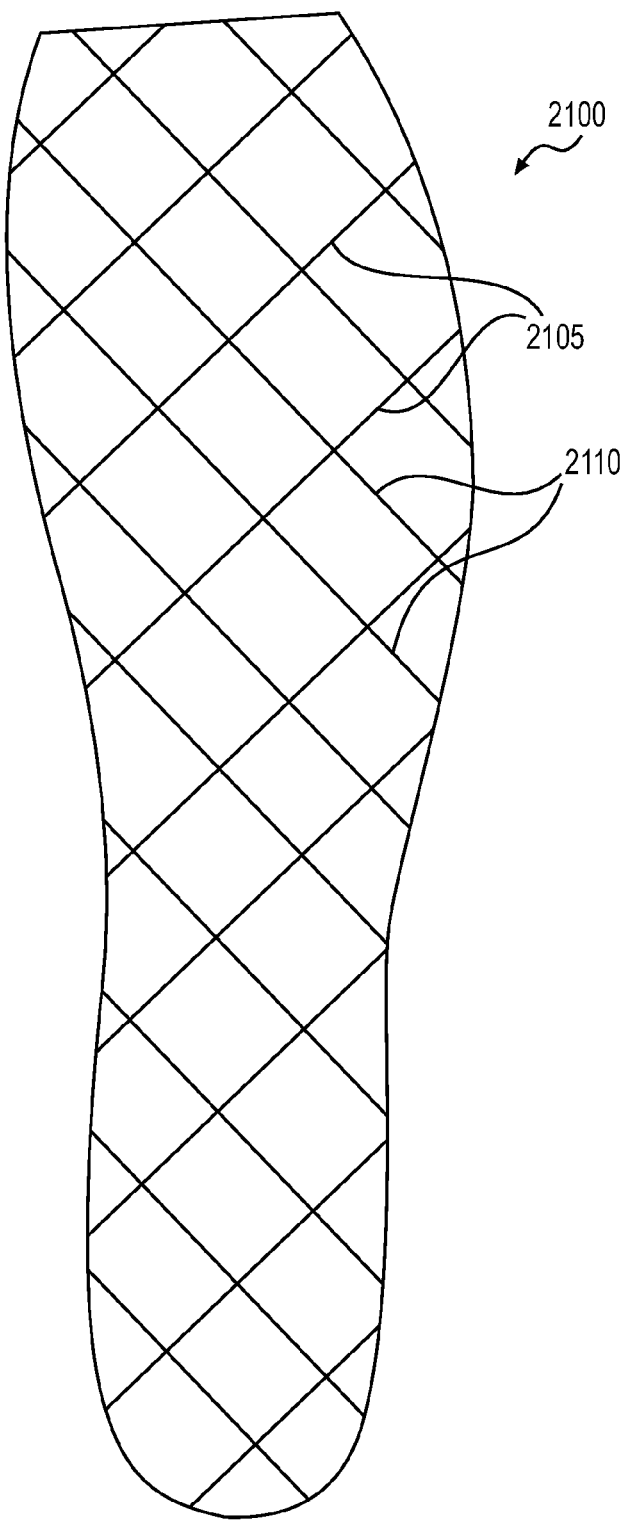
FIG. 21 illustrates a stitching pattern for a chamber for an article of footwear according to another exemplary embodiment.

FIG. 21 illustrates another stitching pattern for a chamber for an article of footwear. As shown in FIG. 21, a chamber 2100 may include a first plurality of stitch lines 2105. In addition, chamber 2100 may include a second plurality of stitch lines 2110. In some embodiments, first plurality of stitch lines 2105 may be substantially perpendicular to second plurality of stitch lines 2110. Further, in some embodiments, first plurality of stitch lines 2105 may overlap second plurality of stitch lines 2110, thus forming a grid of stitching. It will be noted that in some embodiments, the stitch lines may be substantially linear, as shown, for example, in FIG. 21. Linear stitch lines may be faster and less costly to produce. Further, a grid of linear stitch lines may provide the chamber with flexibility in multiple directions. In addition, it will be noted that, in some embodiments, the stitch lines may be disposed off-axis. That is, as shown in FIG. 21, neither first plurality of stitch lines 2105 and second plurality of stitch lines 2110 may be oriented at an angle to both the longitudinal direction and the lateral direction.

In some embodiments, overlapping stitch lines, or stitch lines that otherwise extend at angles to one another may reduce flexibility compared to stitch lines that do not have additional stitch lines proximate to and/or overlapping. Accordingly, in some embodiments, the chamber may include stitch lines that are discontinuous.

Figure 22:
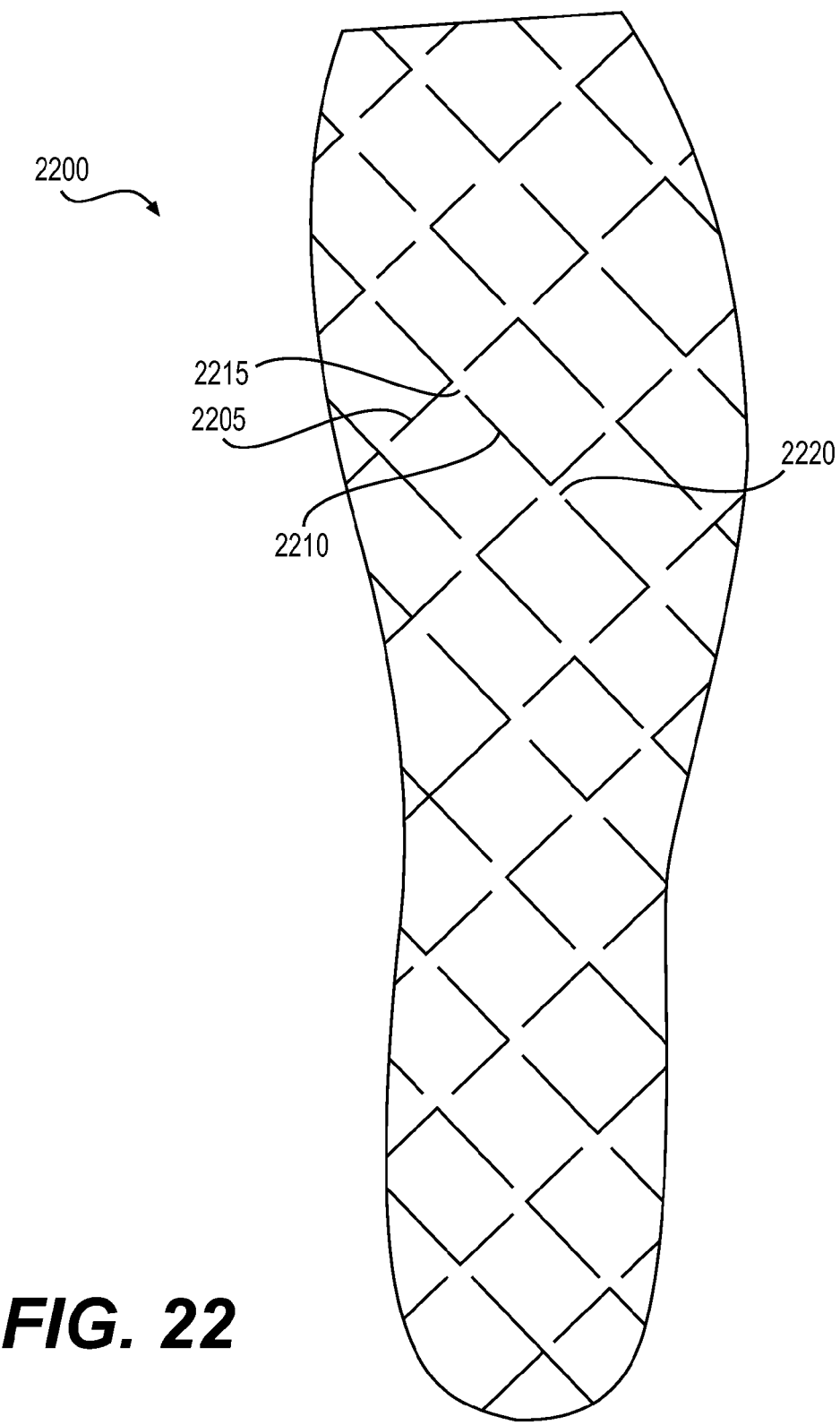
FIG. 22 illustrates a stitching pattern for a chamber for an article of footwear according to another exemplary embodiment.

FIG. 22 illustrates another stitching pattern for a chamber for an article of footwear. As shown in FIG. 22, a chamber 2200 may include an elongate stitched region, in the form of a first stitch line 2205 and a second stitch line 2210. First stitch line 2205 and second stitch line 2210 may be oriented along axes that intersect with one another. Further, in some embodiments, first stitch line 2205 and second stitch line 2210 may intersect one another. However, as shown in FIG. 22, both first stitch line 2205 and second stitch line 2210 may be discontinuous, and thus may not overlap one another. As shown in FIG. 22, first stitch line 2205 may include a first gap 2215. Similarly, second stitch line 2210 may include a second gap 2220. First gap 2215 and second gap 2220 may prevent first stitch line 2205 and second stitch line 2210 from overlapping, and thus may avoid any reduction in flexibility that may be provide by such overlapping.

In some embodiments, stitching patterns may be arranged to provide differing flexibility in different portions of the chamber. For example, in some embodiments, multi-axial flexibility may be desired in some areas of the foot, such as the forefoot region, whereas single-axis flexibility may be desired in other areas of the foot, such as a midfoot region. Accordingly, different stitching patterns may be used in different portions of the chamber.

Figure 23:
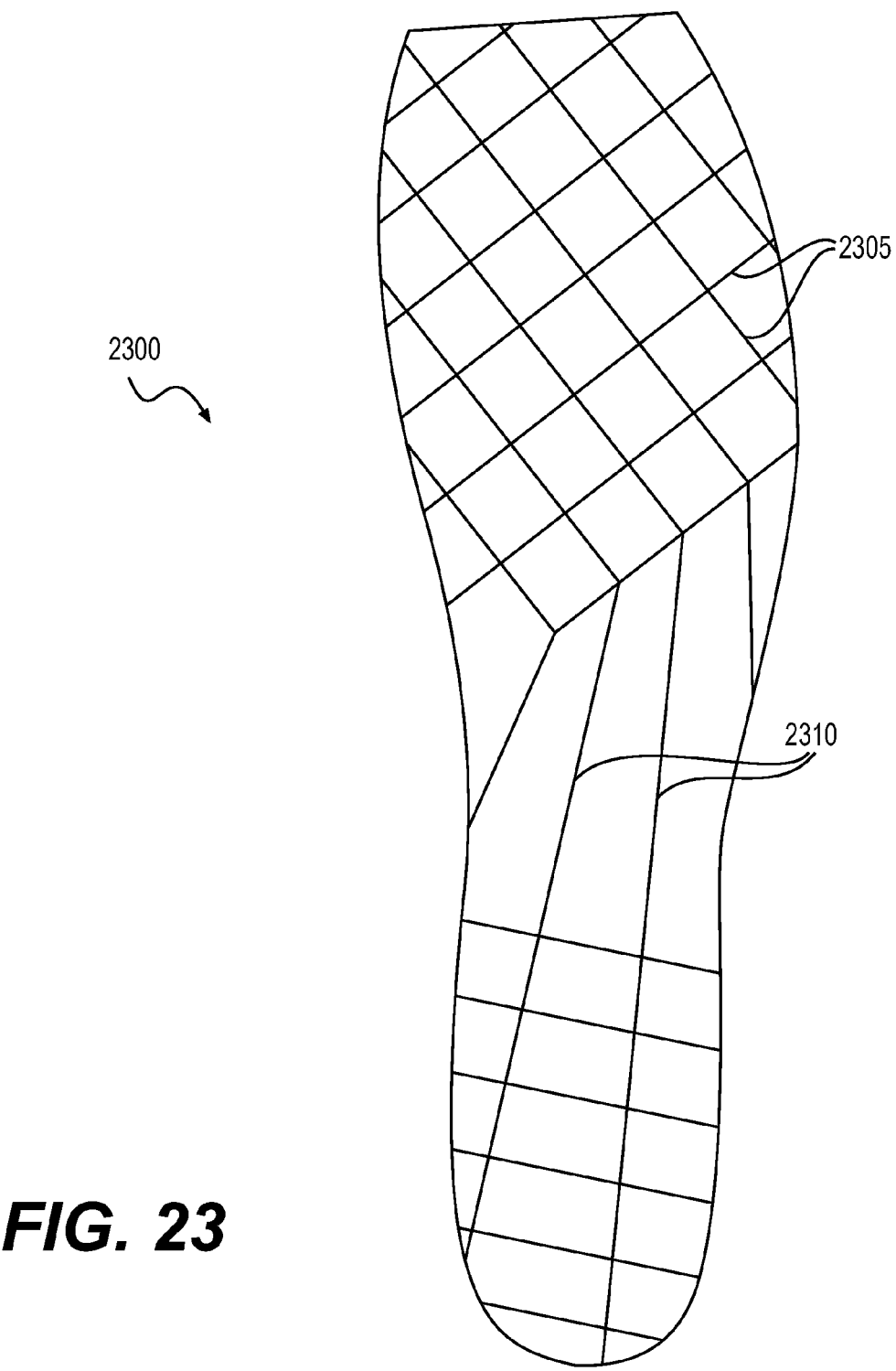
FIG. 23 illustrates a stitching pattern for a chamber for an article of footwear according to another exemplary embodiment.

FIG. 23 illustrates another stitching pattern for a chamber for an article of footwear. As shown in FIG. 23, a chamber 2300 may include a first set of stitch lines 2305 in the forefoot region of chamber 2300. First set of stitch lines 2305 may be formed in a grid-like arrangement, which may provide multi-axial flexibility. In addition, chamber 2300 may include a second set of stitch lines 2310 in the midfoot region of chamber 2300. Second set of stitch lines 2310 may be arranged substantially parallel to one another, and may be oriented in a substantially longitudinal direction. Such longitudinally arranged stitch lines may provide increased flexibility in the lateral direction.

Figure 24:
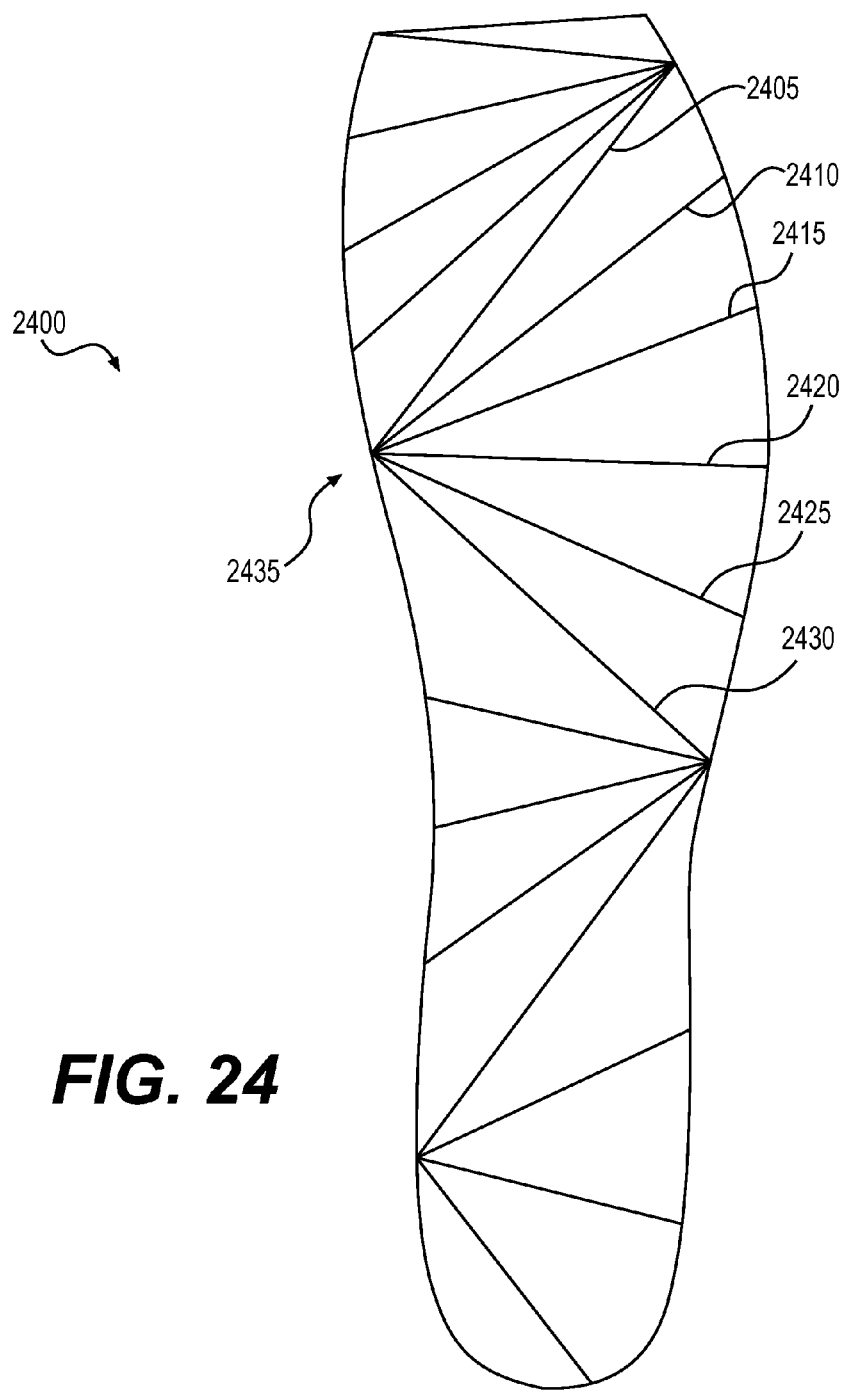
FIG. 24 illustrates a stitching pattern for a chamber for an article of footwear according to another exemplary embodiment.

In some embodiments, stitch lines may be arranged in an asymmetric manner to permit and/or control asymmetric aspects of foot motion. FIG. 24 illustrates another stitching pattern for a chamber for an article of footwear. As shown in FIG. 24, a chamber 2400 may include a plurality of elongate portions, such as stitch lines, radiating in different directions from a central point. For example, as shown in FIG. 24, chamber 2400 may include a first stitch lines 2405, a second stitch line 2410, a third stitch line 2415, a fourth stitch line 2420, a fifth stitch line 2425, and a sixth stitch line 2430. As further shown in FIG. 24, first stitch lines 2405, second stitch line 2410, third stitch line 2415, fourth stitch line 2420, fifth stitch line 2425, and sixth stitch line 2430 may all converge at a common center point 2435. As shown in FIG. 24, center point 2435 may be disposed on a medial side of the forefoot region of chamber 2400. Thus, the radiating portions of the stitch lines may extend toward the lateral side of chamber 2400. Since converging stitch lines may decrease flexibility, the additional space between the stitch lines on the lateral side of chamber 2400 may provide chamber 2400 with a greater amount of flexibility on the lateral side. In some embodiments, the center point may be located elsewhere, such as on the lateral side of the chamber, and the stitch lines may radiate in generally medial directions. In some embodiments, both configurations may be included in the same chamber, as shown in FIG. 24.

Figure 25:
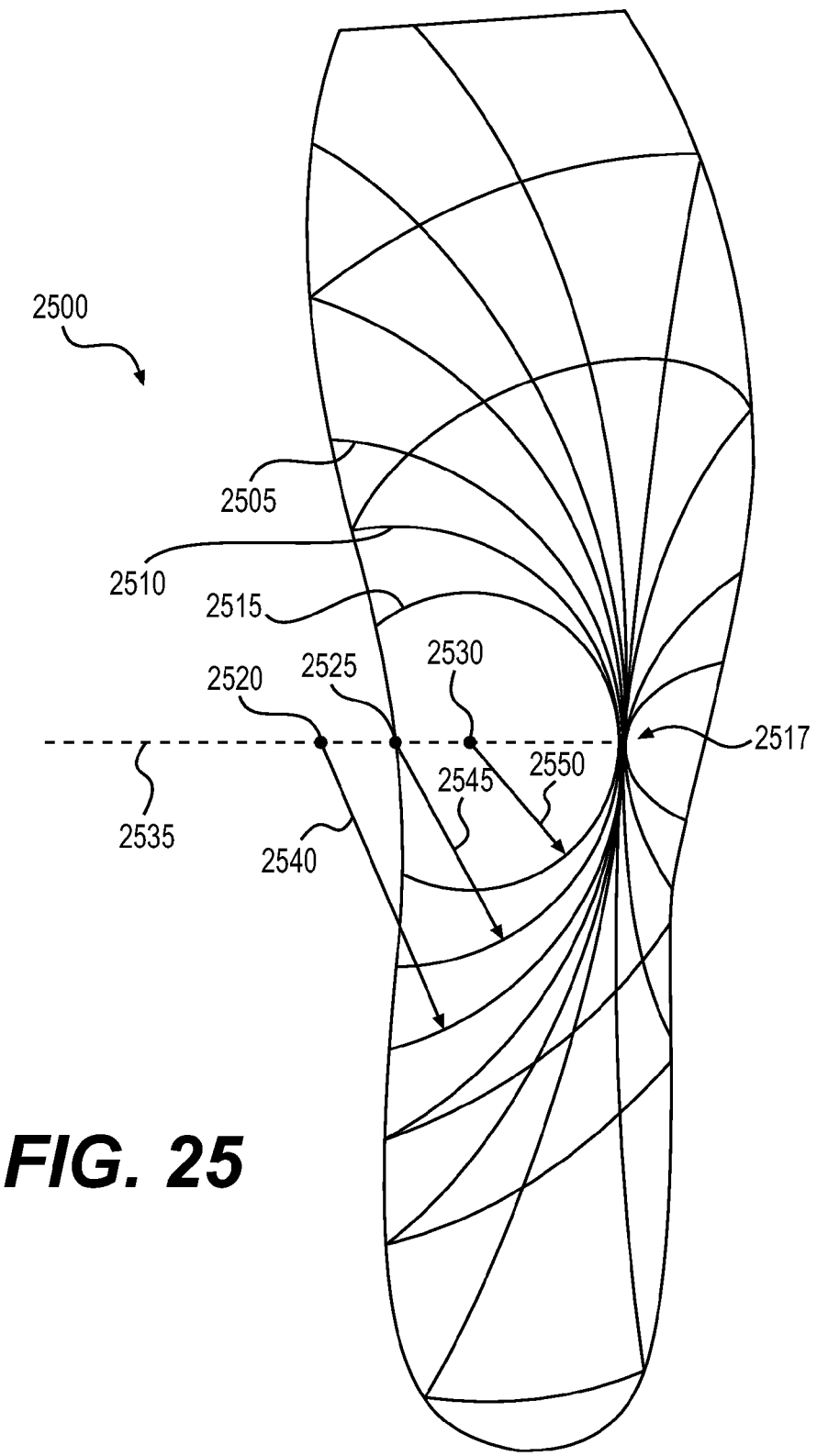
FIG. 25 illustrates a stitching pattern for a chamber for an article of footwear according to another exemplary embodiment.

While the embodiment shown in FIG. 24 utilizes substantially linear stitch lines, in other embodiments, converging stitch lines may be curved. FIG. 25 illustrates another stitching pattern for a chamber for an article of footwear. As shown in FIG. 25, a chamber 2500 may include a stitched region including a plurality of curved portions intersecting at a common intersection point. For example, chamber 2500 may include a first stitch line 2505, a second stitch line 2510, and a third stitch line 2515. As shown in FIG. 25, first stitch line 2505, second stitch line 2510, and third stitch line 2515 may intersect at an intersection point 2517.

As further shown in FIG. 25, in some embodiments, the plurality of curved portions may be curved about center points disposed on a common line, wherein the plurality of curved portions each have a different radius of curvature. For example, as shown in FIG. 25, first stitch line 2505 may be curved about a first center point 2520. Second stitch line 2510 may be curved about a second center point 2525. Third stitch line 2515 may be curved about a third center point 2530. As shown in FIG. 25, first center point 2520, second center point 2525, and third center point 2530 may be disposed on a common line 2535. Further, first stitch line 2505 may have a first radius of curvature 2540, second stitch line 2510 may have a second radius of curvature 2545, and third stitch line 2515 may have a third radius of curvature 2550. As shown in FIG. 25, first radius of curvature 2540, second radius of curvature 2545, and third radius of curvature 2550 may be different from one another. This may result in two sets of radiating stitch lines. As shown in FIG. 25, one set of radiating stitch lines may extend toward a forefoot region of chamber 2500, and a second set of radiating stitch lines may extend toward a heel region of chamber 2500, the intersection 2517 being disposed in a midfoot region of chamber 2500.

In some embodiments, both curved and linear stitch lines may be utilized in a stitch pattern for a chamber. In some embodiments, such curved stitch lines may intersect with linear stitch lines. In order to avoid undesired reduction in flexibility due to overlapping, the curved stitch lines may intersect with the linear stitch lines in a non-overlapping manner.

Figure 26:
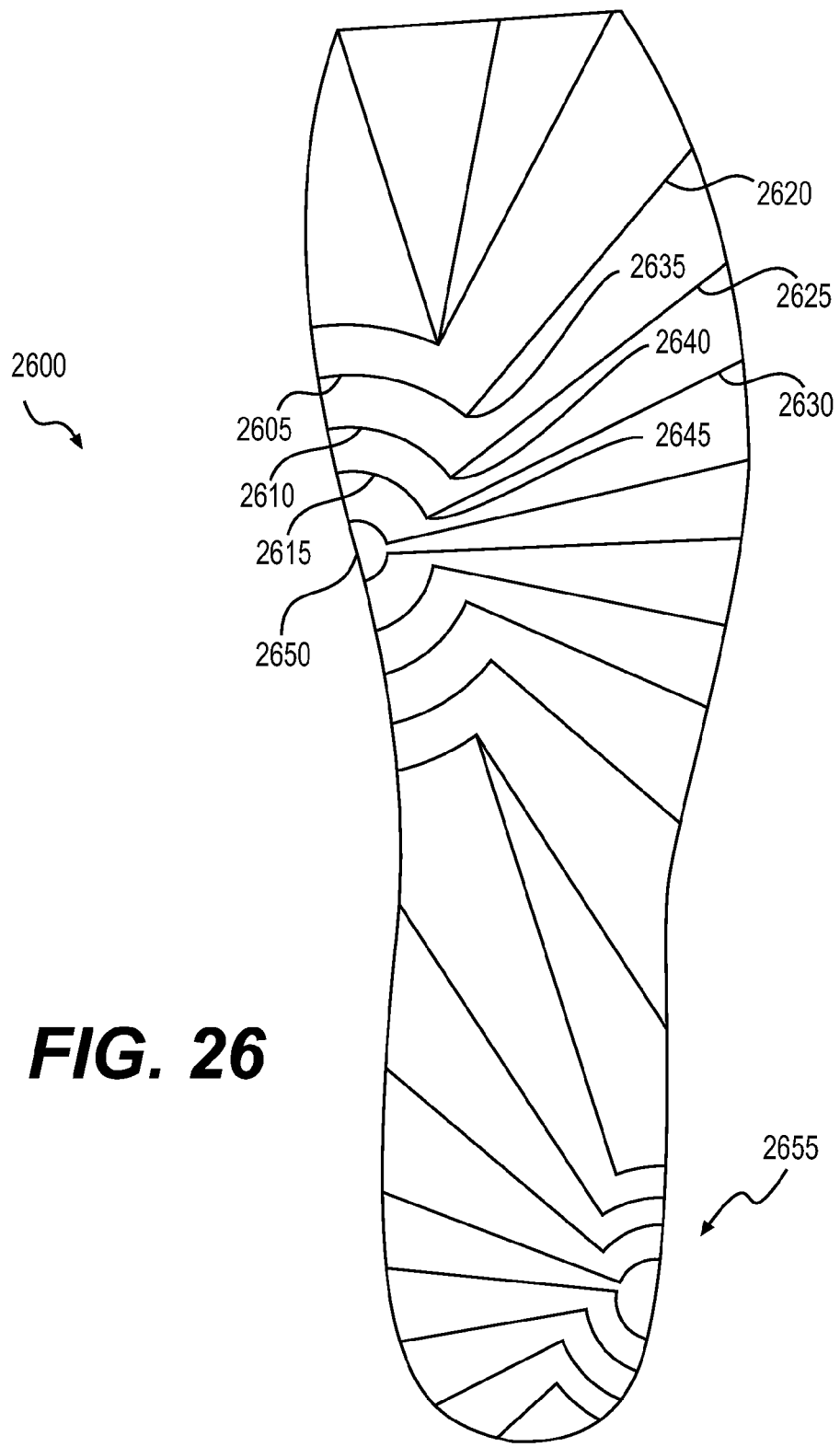
FIG. 26 illustrates a stitching pattern for a chamber for an article of footwear according to another exemplary embodiment.

FIG. 26 illustrates another stitching pattern for a chamber for an article of footwear. As shown in FIG. 26, a chamber 2600 may include a first curved stitch line 2605, a second curved stitch line 2610, a third curved stitch line 2615. In some embodiments, these curved stitch lines may be concentric about a common center point 2650. In addition, as further shown in FIG. 26, chamber 2600 may include a first linear stitch line 2620, a second linear stitch line 2625, and a third linear stitch line 2630. These linear stitch lines may also each extend along axes that intersect with center point 2650.

In some embodiments, first curved stitch line 2605 may intersect with first linear stitch line 2620 at a first intersection point 2635. Second curved stitch line 2610 may intersect with second linear stitch line 2625 at a second intersection point 2640. Third curved stitch line 2615 may intersect with third linear stitch line 2630 at a third intersection point 2645. As shown in FIG. 26, the curved stitch lines and linear stitch lines may not overlap at these intersection points. As shown in FIG. 26, in some embodiments, the curved stitch lines may be disposed on a medial side of chamber 2600, and the linear stitch lines may be disposed on a lateral side of chamber 2600. This arrangement may provide differing flexibility to support or control different foot motions on the medial and lateral sides of the foot. In other embodiments, the location of curved and linear stitch lines maybe reversed. In some embodiments center point 2650 may be located in a forefoot region of chamber 2600. In other embodiments, the center point may be located elsewhere, such as in a heel region of chamber 2600. As shown in FIG. 26, in some embodiments, both arrangements may be used, for example, a laterally radiating arrangement in the forefoot region, and a medially radiating arrangement in the heel region.

Figure 27:
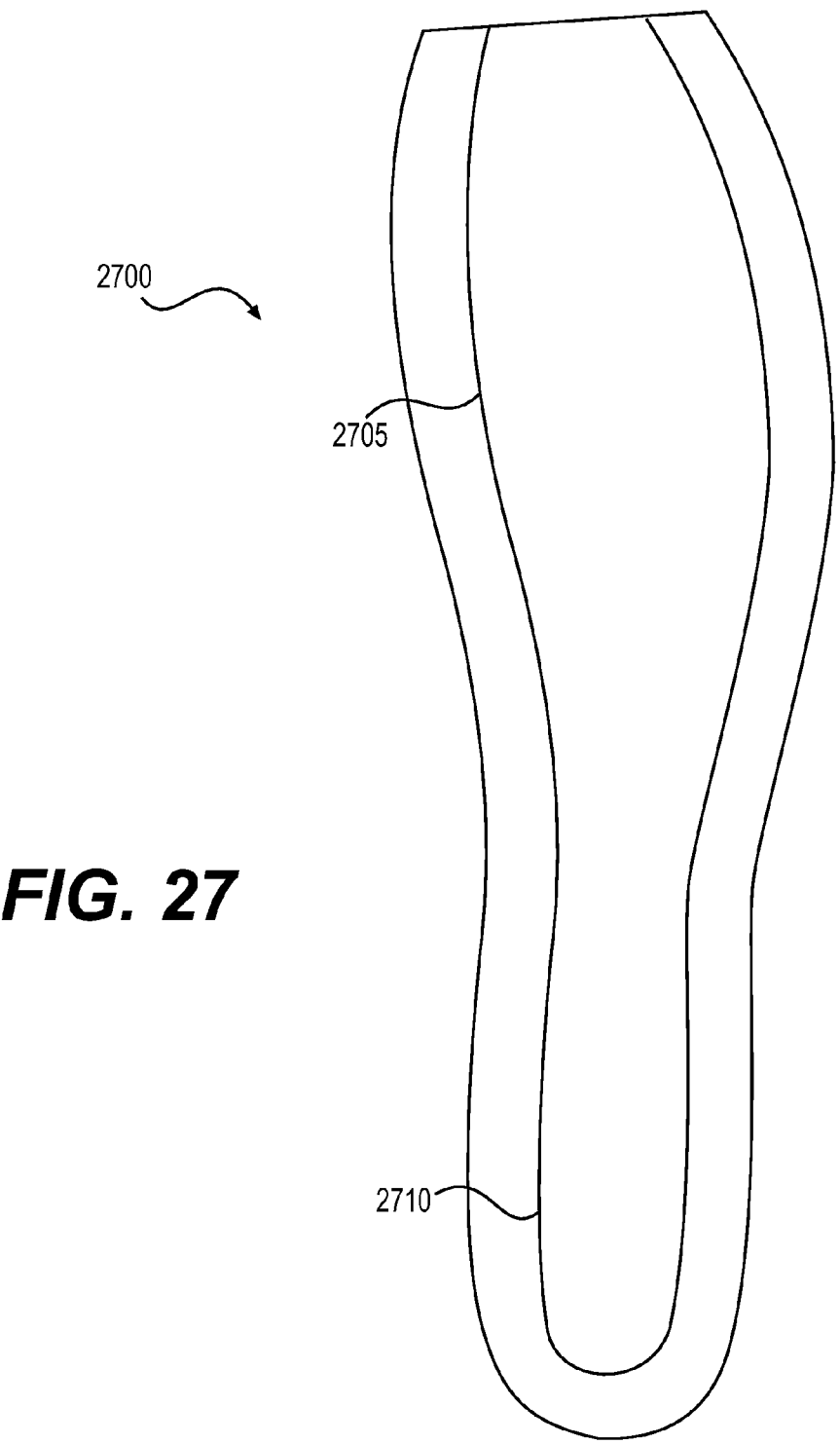
FIG. 27 illustrates a stitching pattern for a chamber for an article of footwear according to another exemplary embodiment.

In some embodiments, it may be desirable to provide flexibility around the peripheral edge of the chamber. FIG. 27 illustrates another stitching pattern for a chamber for an article of footwear. As shown in FIG. 27, a chamber 2700 may include an elongate stitched region, for example, including a stitch line 2705. In some embodiments, as shown in FIG. 27, the stitched region including stitch line 2705 may extend around a periphery of chamber 2700. Further, in some embodiments, stitch line 2700 may be substantially evenly spaced from an edge of chamber 2700 in a heel region 2710 of chamber 2700. Such a configuration may cradle the foot of the wearer, but enabling peripheral portions of chamber 2700 to flex upward to wrap around the outside of the foot.

Figure 28:
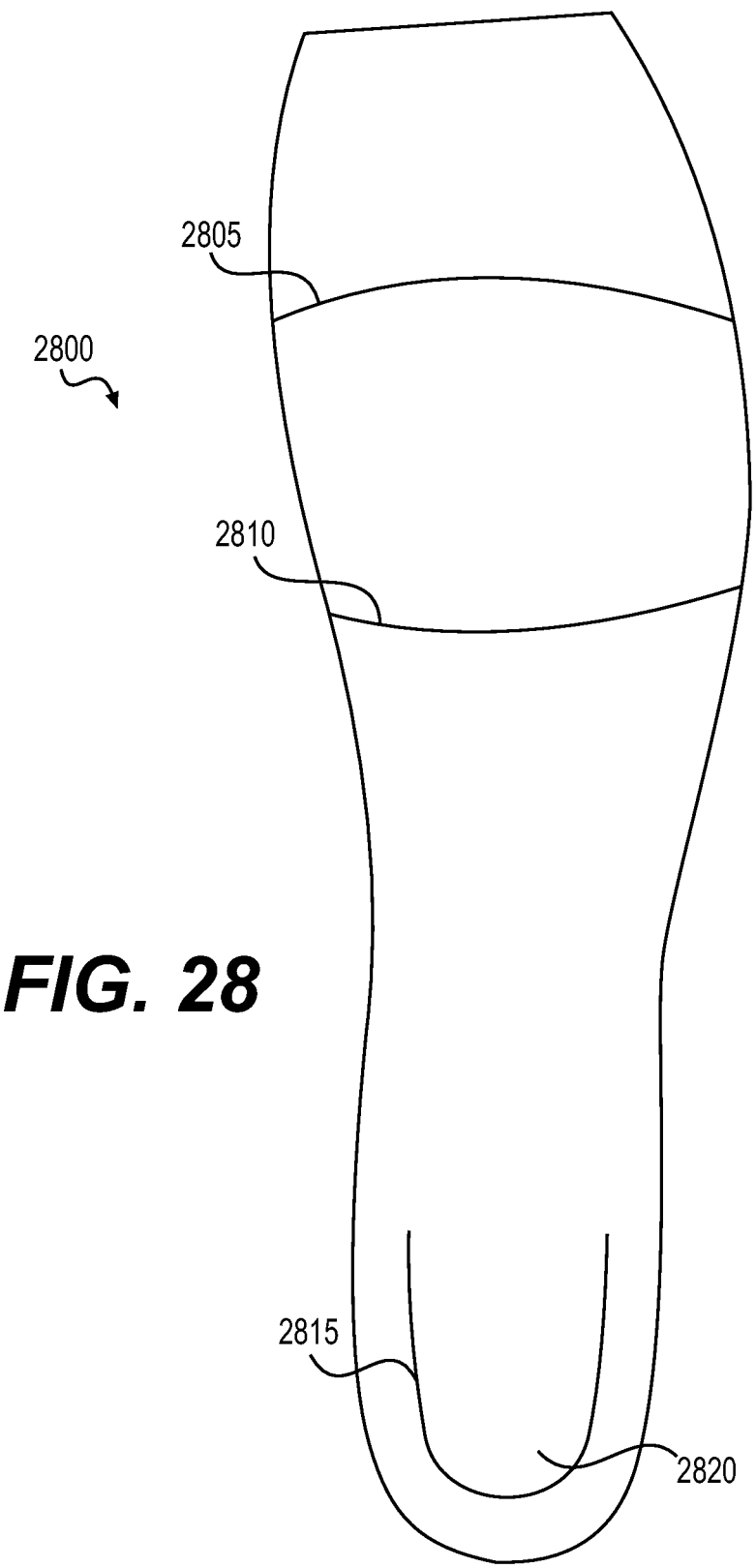
FIG. 28 illustrates a stitching pattern for a chamber for an article of footwear according to another exemplary embodiment.

In some embodiments, stitching may be used in chambers to provide flexibility in certain regions and to provide contours in other regions. FIG. 28 illustrates another stitching pattern for a chamber for an article of footwear. As shown in FIG. 28, a chamber 2800 may include a first stitch line 2805 in a forefoot region of chamber 2800. In addition, chamber 2800 may include a second stitch line 2810 in the forefoot region. First stitch line 2805 and second stitch line 2810 may extend in substantially lateral directions across the forefoot region of chamber 2800. Accordingly, first stitch line 2805 and seconds stitch line 2810 may provide flexibility to the forefoot region of chamber 2800.

In addition, as shown in FIG. 28, chamber 2800 may include a curved stitch line 2815. Curved stitch line 2815 may extend about a peripheral portion of a heel region of chamber 2800. Curved stitch line 2815 may provide flexibility to the peripheral portions of the heel region in order to cradle the heel of a wearer in a central area 2820 of the heel region.

Figure 29:
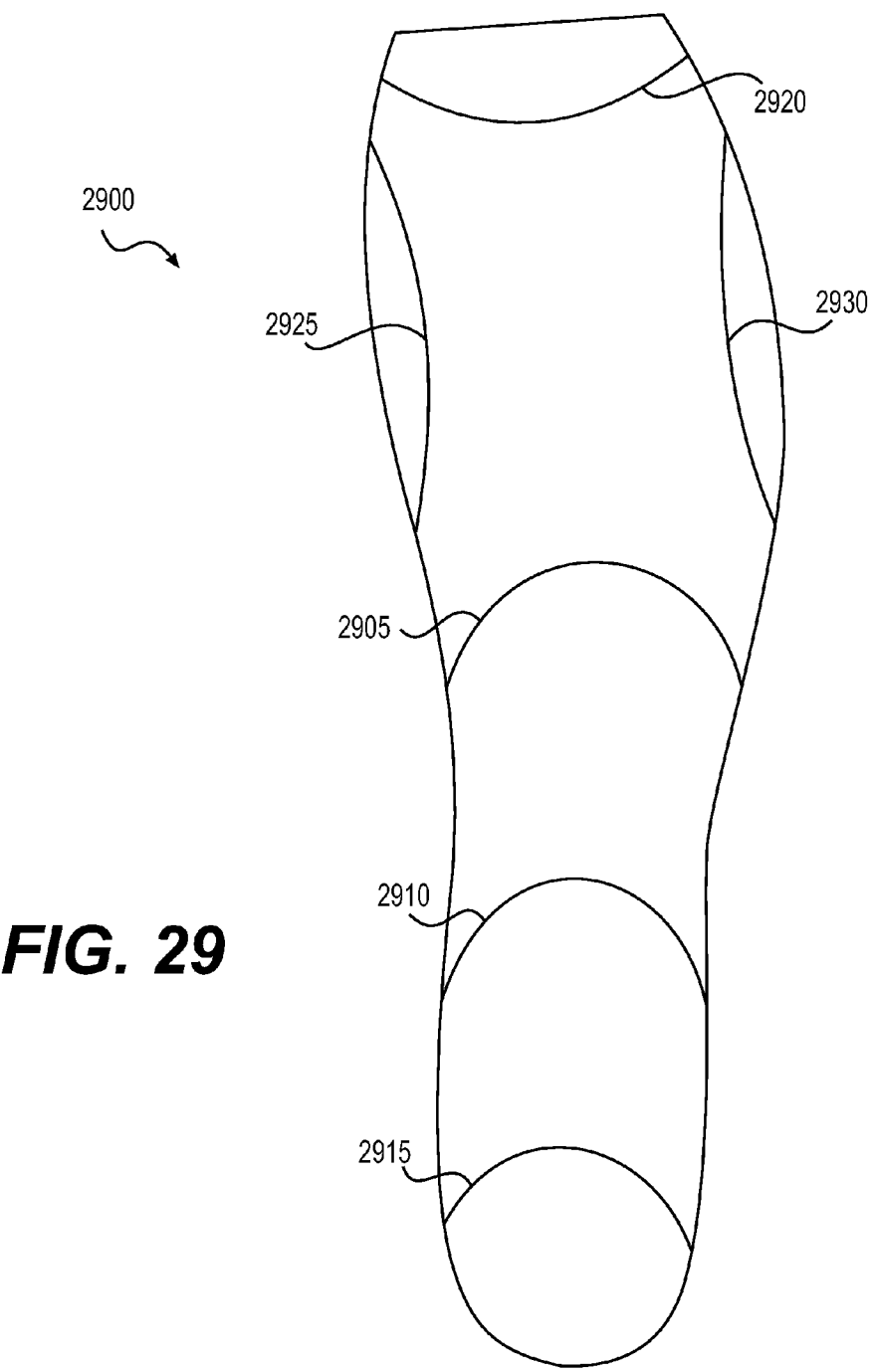
FIG. 29 illustrates a stitching pattern for a chamber for an article of footwear according to another exemplary embodiment.

In some embodiments, stitching may provide flexibility at lateral and medial edges of the chamber, in select areas. FIG. 29 illustrates a stitching pattern for a chamber for an article of footwear. FIG. 29 shows a chamber 2900, including a stitched region including a plurality of curved stitch lines. For example, chamber 2900 may include a first stitch line 2905, a second stitch line 2910, and a third stitch line 2915. These three stitch lines may be curved in the same direction and may be substantially parallel to one another. In addition, these lines may extend in a substantially lateral direction across chamber 2900, in order to provide longitudinal flexibility to chamber 2900.

Chamber 2900 may also include a toe stitch line 2920, which may be curved in an opposite direction as first stitch line 2905, second stitch line 2910, and third stitch line 2915. Further, chamber 2900 may include a medial curved stitch line 2925 disposed proximate a medial edge of chamber 2900. In addition, chamber 2900 may include a lateral curved stitch line 2930 disposed proximate a lateral edge of chamber 2900. Medial curved stitch line 2925 and lateral curved stitch line 2930 may provide flexibility at the medial and lateral edges of a forefoot region of chamber 2900.

Figure 30:
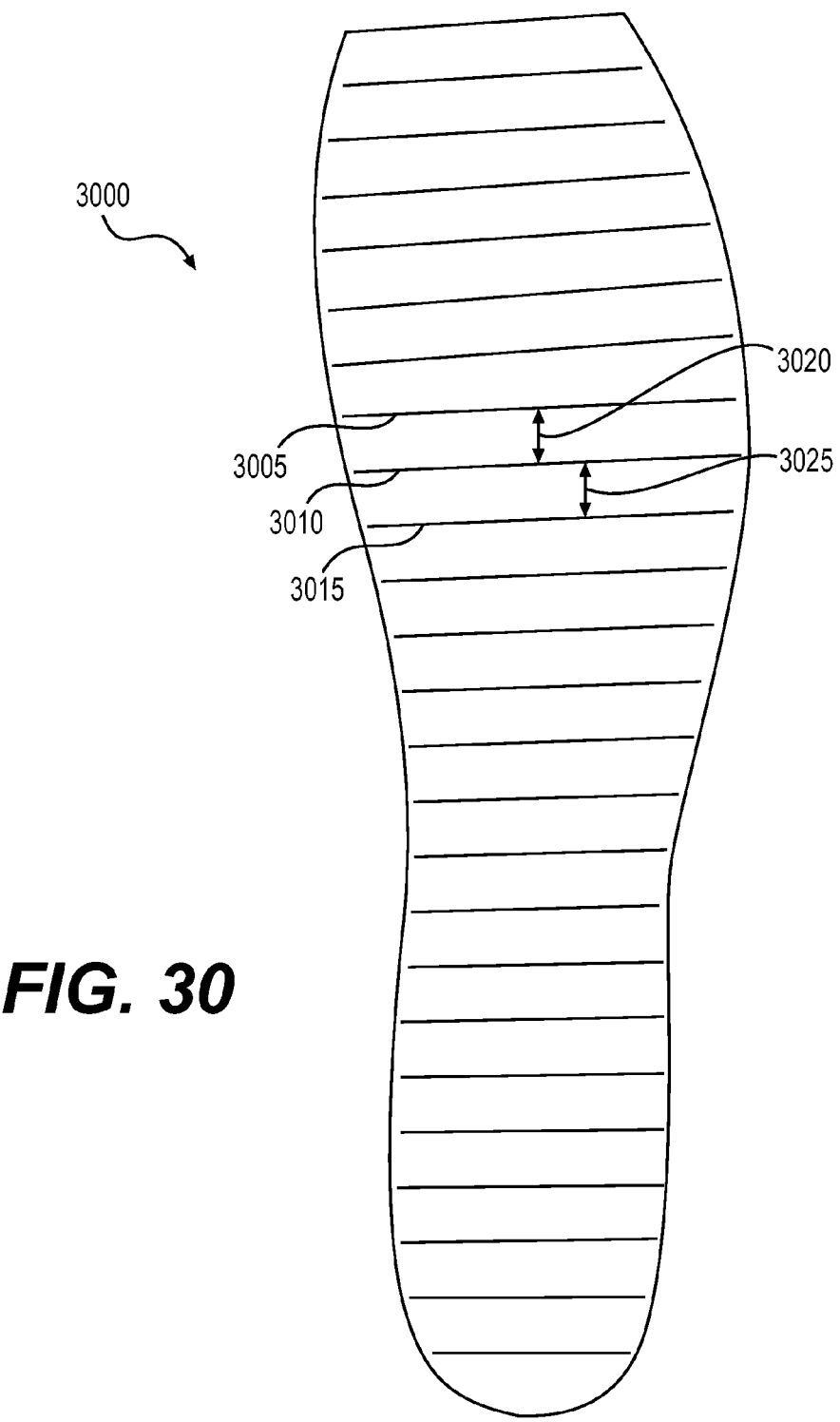
FIG. 30 illustrates a stitching pattern for a chamber for an article of footwear according to another exemplary embodiment.

In some embodiments, substantially uni-directional flexibility may be provided by arranging the stitched regions in substantially parallel lines. FIG. 30 illustrates another stitching pattern for a chamber for an article of footwear. As shown in FIG. 30, a chamber 3000 may include a plurality of substantially parallel stitch lines. As shown in FIG. 30, in some embodiments, the stitch lines may extend in a substantially lateral direction, in order to provide longitudinal flexibility to chamber 3000. In some embodiments, the stitch lines may be equidistant from one another (i.e., evenly spaced), in order to provide a substantially consistent flexibility over the length of the chamber. For example, chamber 3000 may include a first stitch line 3005, a second stitch line 3010 substantially parallel to first stitch line 3005, and a third stitch line 3015 substantially parallel to second stitch line 3010. First stitch line 3005 may be disposed a first distance 3020 from second stitch line 3010. In addition, second stitch line 3010 may be disposed a second distance 3025 from third stitch line 3015. In some embodiments, first distance 3020 may be substantially the same as second distance 3025, as shown in FIG. 30. In other embodiments, first distance 3020 and second distance 3025 may be substantially different. Substantially different distances between parallel stitch lines may be implemented to provide differing flexibility to different portions of the chamber.

In some embodiments, multiple stitch lines may be disposed adjacent to one another to provide different flexibility characteristics than single stitch lines. Multiple stitch lines may provide wider areas of reduced thickness in the chamber, which may increase flexibility.

Figure 31:
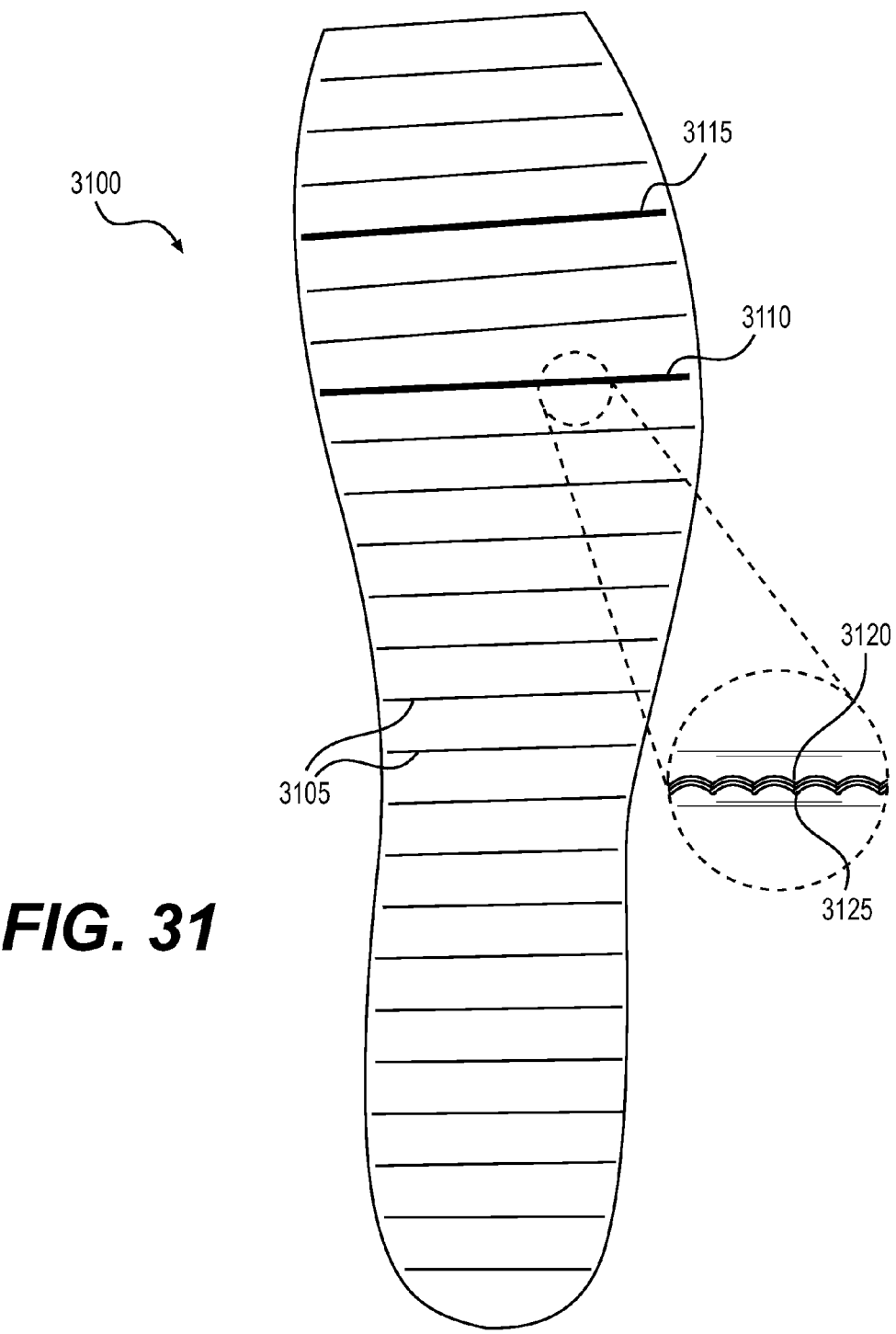
FIG. 31 illustrates a stitching pattern for a chamber for an article of footwear according to another exemplary embodiment.

FIG. 31 illustrates another stitching pattern for a chamber for an article of footwear. FIG. 31 shows a chamber 3100 having a stitched region including a plurality of stitch lines 3105. In addition, chamber 3100 may also include a first flex groove 3110 and a second flex groove 3115. As shown in the enlarged view in FIG. 31, first flex groove 3110 may be formed using multiple stitches adjacent to one another. For example, the stitched region may include at least two elongate lines of stitching, including a first line of stitching 3120 and a second line of stitching 3125 arranged parallel and adjacent to first line of stitching 3120.

In some embodiments, differing flexibility may be provided with stitching by holding opposing layers of the tensile member at varying distances from one another, thus varying the amount to which the thickness of the chamber is reduced in the stitched regions. A greater reduction in thickness of the chamber will provide more flexibility. In some embodiments, different flexibility may be provided in different portions of the same chamber, by utilizing stitch lines that draw opposing layers of the tensile member toward each other by differing amounts.

Figure 32:
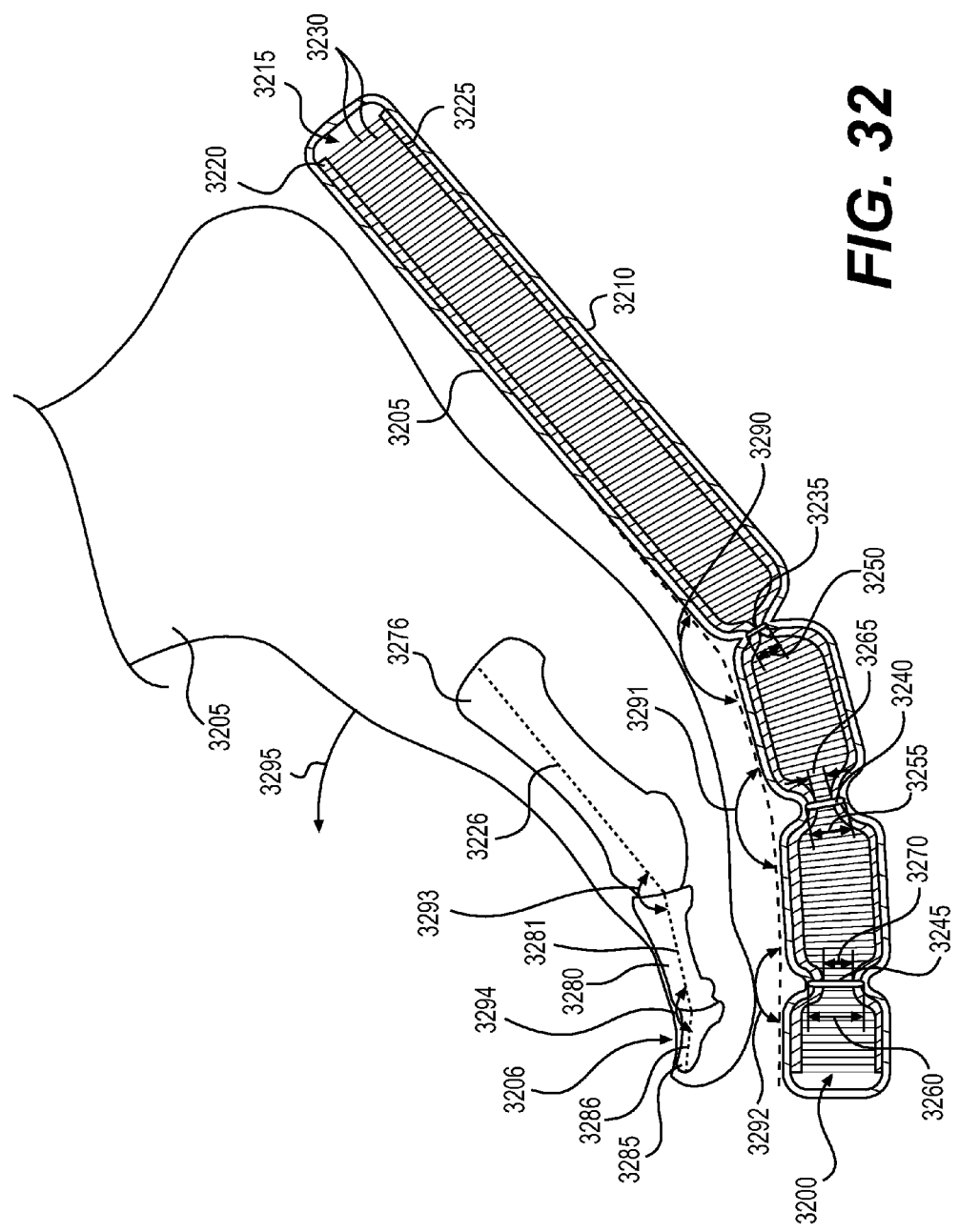
FIG. 32 is a cross sectional view illustrating an exemplary sole structure in an articulated configuration.

As shown in FIG. 32, a chamber 3200 may include multiple stitch lines. Similar to other embodiments discussed above, chamber 3200 may include a first chamber barrier layer 3205 and a second chamber barrier layer 3210. In addition, chamber 3200 may also include a tensile member 3215, which may include a first tensile member layer 3220, a second tensile member layer 3225, and a plurality of tethers 3230.

Chamber 3200 may include a first stitched region 3235, a second stitched region 3240, and a third stitched region 3245. In unstitched regions of tensile member 3215, when chamber 3200 is pressurized with a pressurized fluid, a substantial majority of first tensile member layer 3220 is separated from second tensile member layer 3225 by a distance that corresponds to a length of tethers 3230. As shown in FIG. 32, first stitched region 3235 features stitching having a first length 3250. Under pressurization, first tensile member layer 3220 is held against second tensile member layer 3225 by the stitching in first stitched region 3235.

As shown in FIG. 32, second stitched region 3240 may feature stitching having a second length 3255, which is longer than first length 3250. Accordingly, upon pressurization of chamber 3200, first tensile member layer 3220 may be held a first distance 3265 away from second tensile member layer 3225. Further, third stitched region may feature stitching having a third length 3260, which is longer than second length 3255. Accordingly, upon pressurization of chamber 3200, first tensile member layer 3220 may be held a second distance 3270 away from second tensile member layer 3225. In some embodiments, second distance 3270 may be greater than first distance 3265.

As illustrated in FIG. 32, these different length stitches provide different amounts of reduction in the thickness of chamber 3200, which provides different amounts of flexibility. First stitched region 3235 provides the largest reduction in chamber thickness, and thus, provides the greatest flexibility, as indicated by an angle 3290. Second stitched region 3240 provides the next largest reduction in chamber thickness, and thus, provides a slightly less amount of flexibility, as indicated by an angle 3291, which is less acute than angle 3290. Similarly, third stitched region 3245 provides the least reduction in chamber thickness, and thus, provides the least flexibility, which is indicated by an angle 3292, which is less acute than angle 3291.

As further shown in FIG. 32, varying chamber flexibility may be disposed at locations of the sole structure that correspond with predetermined portions of a wearer's foot 3205. In some cases, stitched lines may provide hinges in chambers that correspond generally with portions of the wearer's foot that bend, such as the forefoot. In some embodiments, stitched lines may provide hinges that are configured to be substantially aligned with articulating joints of the wearer's foot. For example, as shown in FIG. 32, first stitched region 3235 may be configured to be aligned with a joint between a first bone 3275 (e.g., a first metatarsal) and a second bone 3280 (e.g., a first phalanx) of the wearer's foot. In contrast, a joint between second bone 3280 and a third bone 3285 (e.g., hallux) may be located proximate to, but generally between second stitched region 3240 and third stitched region 3245.

FIG. 32 illustrates the correlation between the amount of articulation of the joints of foot 3205 and the amount of flexibility provided in corresponding portions of chamber 3200. For example, first bone 3275 may have a first longitudinal axis 3276, second bone 3280 may have a second longitudinal axis 3281, and third bone 3285 may have a third longitudinal axis 3286. As shown in FIG. 32, a fourth angle 3293 between first longitudinal axis 3276 and second longitudinal axis 3281 may be greater than a fifth angle 3294 between second longitudinal axis 3281 and third longitudinal axis 3286.

Varying the distance at which opposing layers of the tensile member are held with respect to one another may also be implemented to provide the chamber with contours. For example, anatomical contours may provide improvements in fit, comfort, support, performance, and other characteristics of a sole structure.

Figure 33:
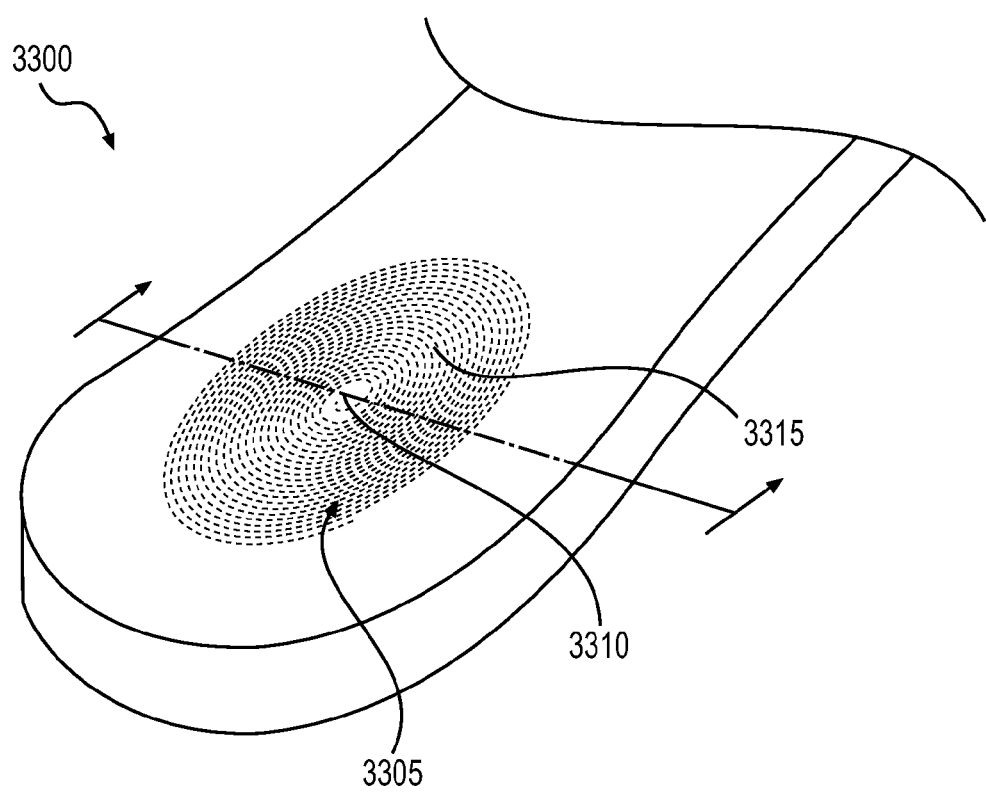
FIG. 33 is a perspective view of a heel region of a chamber according to an exemplary embodiment.

FIG. 33 is a perspective view of a chamber including a contoured heel region. As shown in FIG. 33, a chamber 3300 may include a depression 3305 in a central portion of the heel region. Depression 3305 may be an anatomical contour configured to receive a portion of the foot of a wearer, such as the heel. In some embodiments, the central depression may be formed by utilizing stitching of shorter lengths near a central portion 3310 of depression 3305, and using longer stitching further from central portion 3310. In some embodiments, substantially concentric or spiral stitching 3315 may be utilized to form depression 3305.

Figure 34:
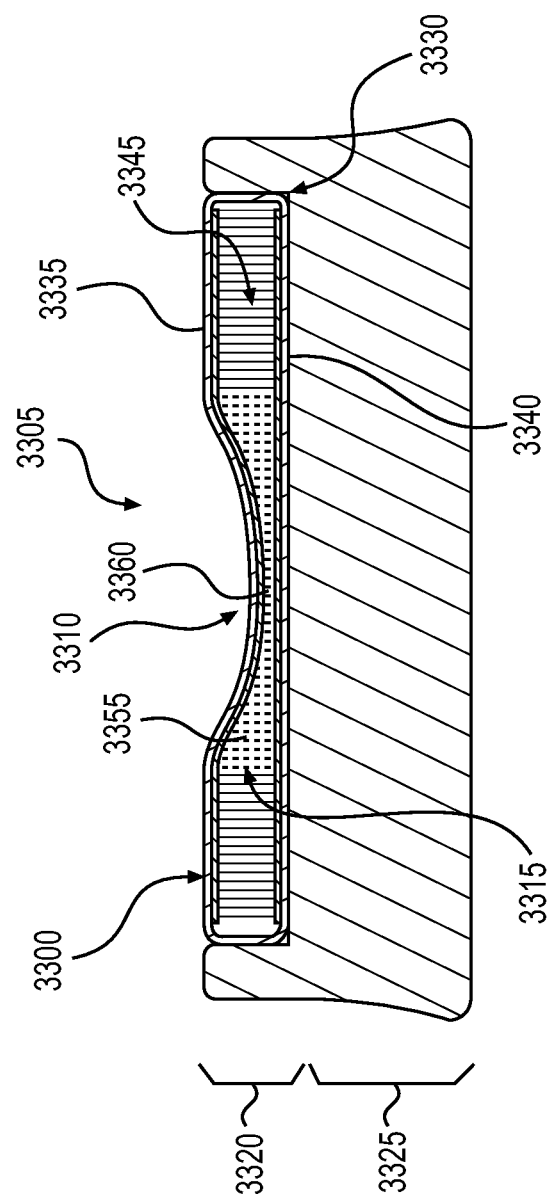
FIG. 34 is a cross-sectional view taken at section line 34-34 in FIG. 33.

FIG. 34 is a cross-sectional view of chamber 3300 taken at section line 34-34 in FIG. 33, through a heel region of chamber 3300. In addition, chamber 3300 is shown, in FIG. 34, as being disposed within a recess 3330 in a midsole 3320, above an outer member 3325. As shown in FIG. 34, chamber 3300 may include a first chamber barrier layer 3335, a second chamber barrier layer 3340, and a tensile member 3345 extending between, and bonded to, first chamber barrier layer 3335 and second chamber barrier layer 3340.

As shown in FIG. 34, chamber 3300 may include a stitched region including stitching 3315. In central portion 3310 of depression 3310, stitching 3315 may include relatively short stitches 3360. In a peripheral portion of depression 3310, stitching 3315 may include relatively longer stitches 3355. As illustrated in FIG. 34, longer stitches 3355 allow first chamber barrier layer 3335 to expand further away from second chamber barrier layer 3340, than short stitches 3360. Stitching 3315 may be tapered and/or curved to form an anatomical depression configured to receive the heel of a wearer. Other anatomical contours may be provided in a similar manner. For example, arch supports, or other contoured features may be provided in chamber 3300.

Figure 35:
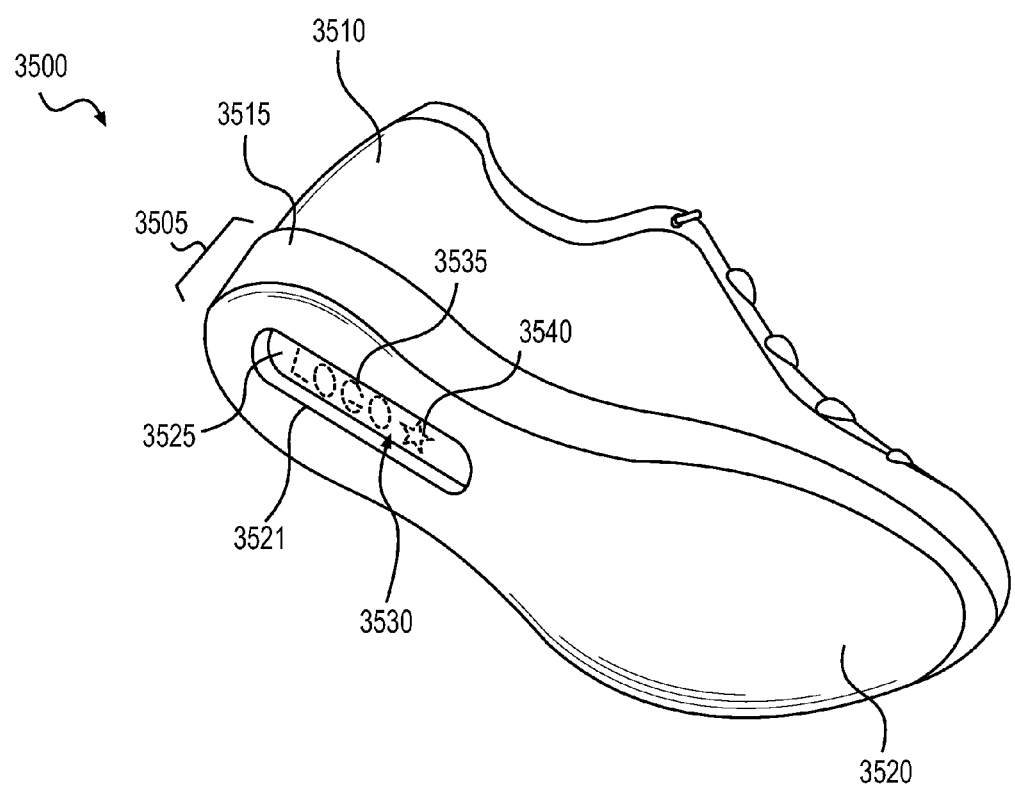
FIG. 35 is a bottom perspective view of an article of footwear according to an exemplary embodiment.

In some embodiments, transparent windows may be utilized in the sole structure, in order to allow viewing of stitching designs in a chamber disposed in the midsole. FIG. 35 is a bottom perspective view of an article of footwear including a transparent window. As shown in FIG. 35, an article of footwear 3500 may include a sole structure 3505 and an upper 3510 secured to the sole structure. As further shown in FIG. 35, sole structure 3505 may include a midsole 3515 and an outer member 3520. In some embodiments, sole structure 3505 may include an opening 3521 through which stitching 3530 of a stitched region of a chamber may be visible. In some embodiments, a substantially transparent window 3525 may be disposed in opening 3521.

In order to facilitate viewing of the stitching, the exposed chamber barrier layer may be formed of a substantially transparent material through which the stitching may be viewed within opening 3521 and, in some embodiments, through substantially transparent window 3525.

Stitching 3530 may have any suitable configuration. In addition to the structural characteristics of the various stitching embodiments discussed above, stitching 3530 may also have various aesthetic properties. For example, in some embodiments stitching 3530 may include alphanumeric characters 3535. Alternatively, or additionally, stitching 3530 may include graphic designs 3540. Exemplary stitching designs may include logos, branding, customized graphics and lettering, or any other suitable designs.

Figure 36:
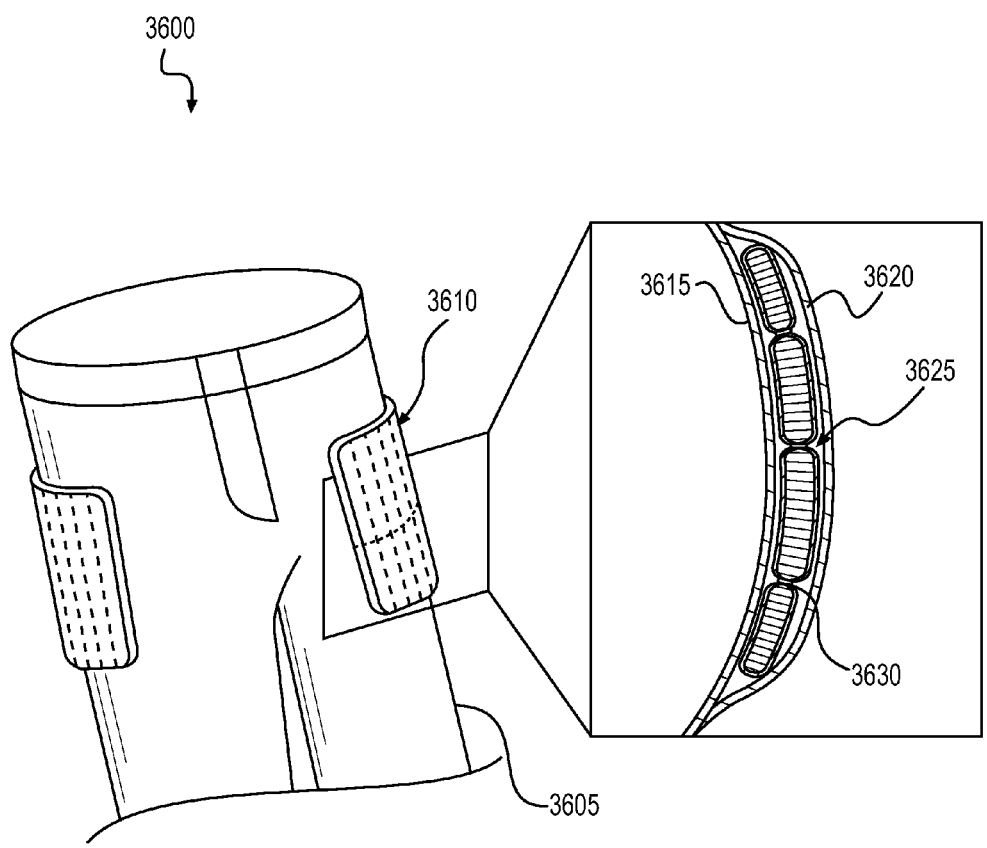
FIG. 36 illustrates a garment having an incorporated chamber according to an exemplary embodiment.

In some embodiments, chambers having configurations discussed above may be implemented in other products (i.e., besides footwear). For example, such chambers may be utilized as padding in garments. For example, FIG. 36 illustrates a garment 3600 including padding 3610. As shown in FIG. 36, garment 3600 may be a pair of pants or shorts. As also shown in FIG. 36, padding 3610 may be disposed on a lateral portion of garment 3600, for example, to provide protection during sporting activities.

As further shown in FIG. 36, padding 3610 may include an inner layer of fabric 3615 and an outer layer of fabric 3620 forming a pouch configured to receive a padding element. In some embodiments, such as shown in FIG. 36, a chamber 3625 may be provided within the pouch. Chamber 3625 may have a stitched region forming a hinged portion 3630 according to any of the embodiments discussed above. With the stitched region 3630, chamber 3625 may be configured to articulate about hinged portion 3630 to thereby form an anatomical shape configured to conform to an anatomical contour of the body of a wearer of the garment.

Figure 37:
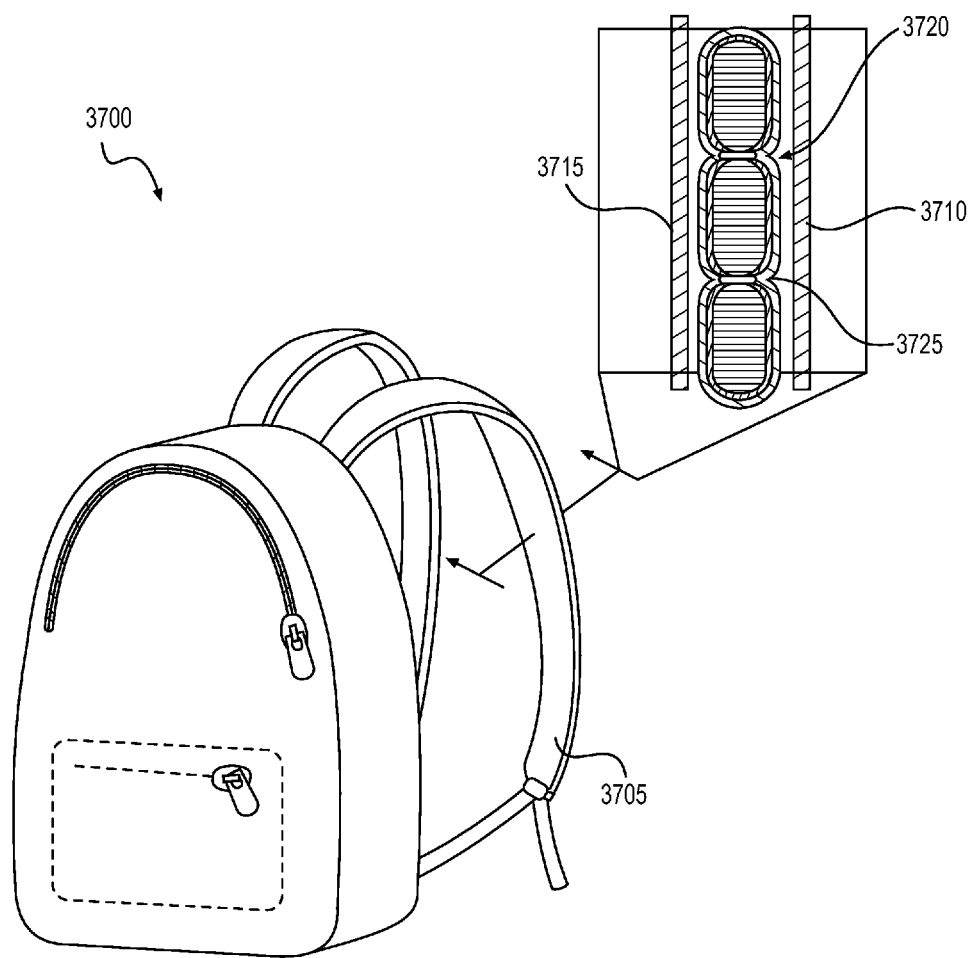
FIG. 37 illustrates a bag having an incorporated chamber according to an exemplary embodiment.

The disclosed chambers may also be applicable for use in other types of equipment. In one example, a shoulder strap of a bag, such as a backpack, may include a fluid-filled chamber according to disclosed embodiments. FIG. 37 illustrates a bag 3700 having a shoulder strap 3705. As illustrated in FIG. 37, shoulder strap 3705 may include a first layer of material 3710 and a second layer of material 3715 defining an inner pocket configured to receive a cushioning element. As shown in FIG. 37, shoulder strap 3705 may include a chamber 3720 having a stitched region providing a reduced thickness in chamber 3720, thus forming a hinged portion 3725. Chamber 3720 may be configured to articulate about hinged portion 3725 forming an anatomical shape configured to conform to an anatomical contour of the body of a carrier of bag 3700.

Figure 38:
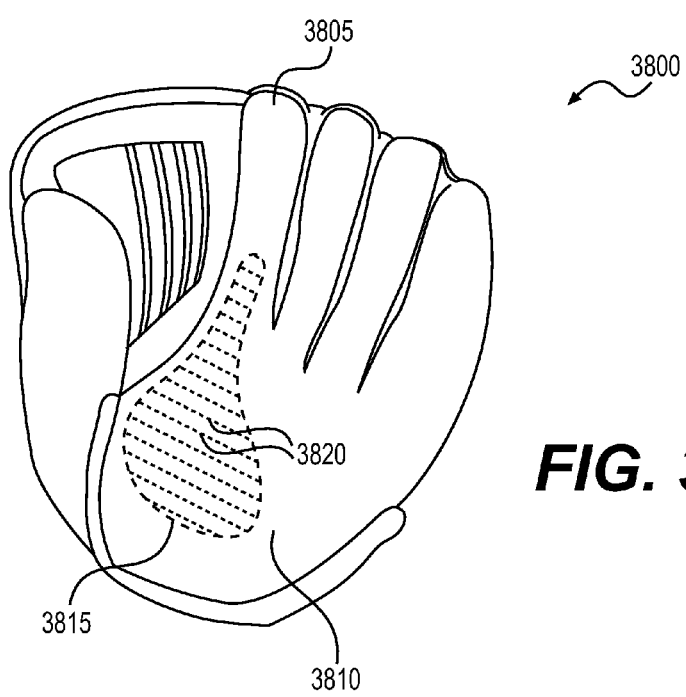
FIG. 38 illustrates a glove having an incorporated chamber according to an exemplary embodiment.
Figure 39:
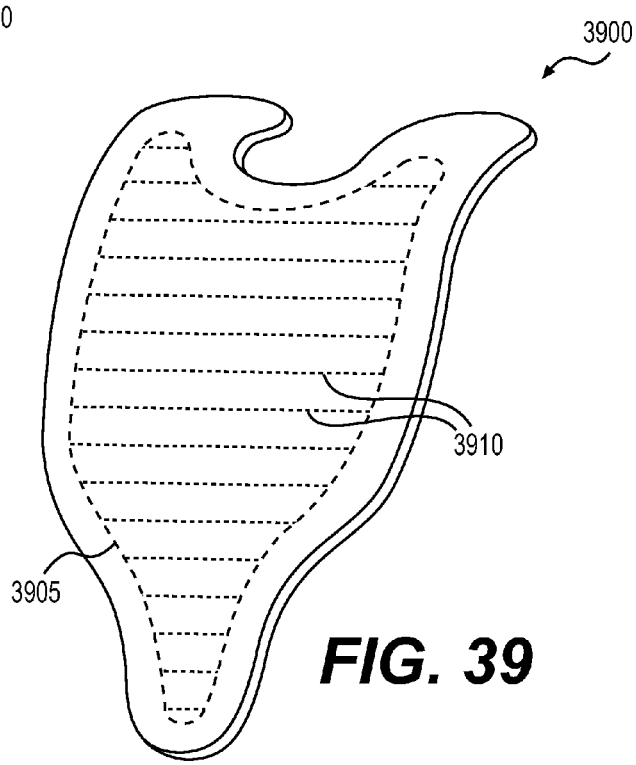
FIG. 39 illustrates a protective chest pad having an incorporated chamber according to an exemplary embodiment.

The disclosed chambers may also be applicable for use in other types of athletic equipment. For example, as shown in FIG. 38, a glove 3800, such as a baseball glove or softball glove, may include a finger region 3805 and a palm region 3810. In some embodiments, glove 3800 may include a chamber 3815, including one or more stitched regions 3820, which may provide a reduced thickness in chamber 3815. The pressurized chamber may provide padding for the glove. In addition, the stitched, hinge-like regions may provide an anatomical curvature and flexion, for example, while closing the hand while catching a ball.

In another embodiment, protective chest pad 3900, such as may be worn by a catcher in baseball or softball, or a goalie in other sports, may include a chamber 3905. Chamber 3905 may include stitching 3910 according to embodiments disclosed above. Stitching 3910 may provide flexibility to chest pad 3900 to allow the pad to be fitted to the contours of the wearer's body, and to flex as the body moves, for example, when a catcher squats down and stands up.

While various embodiments of the invention have been described, the description is intended to be exemplary, rather than limiting, and it will be apparent to those of ordinary skill in the art that many more embodiments and implementations are possible that are within the scope of the invention. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination and that features of one embodiment may be implemented in other disclosed embodiments. Accordingly, the invention is not to be restricted except in light of the attached claims and their equivalents. Also, various modifications and changes may be made within the scope of the attached claims.

What is claimed is:

1. A chamber for receiving a pressurized fluid, the chamber comprising:
   a first chamber barrier layer and a second chamber barrier layer bonded to the first chamber barrier layer to define an interior void between the first chamber barrier layer and the second chamber barrier layer;
   a tensile member extending between the first chamber barrier layer and the second chamber barrier layer within the interior void and including a first tensile member layer attached to the first chamber barrier layer, a second tensile member layer attached to the second chamber barrier layer, and a plurality of tethers extending between the first tensile member layer and the second tensile member layer; and
   a plurality of stitchings attached to the first tensile member layer and to the second tensile member layer to form a first stitched region and a second stitched region disposed between the first chamber barrier layer and the second chamber barrier layer and each providing a portion of the tensile member with a reduced thickness relative to adjacent portions of the tensile member, the first stitched region providing a first portion of the tensile member with a first reduced thickness and the second stitched region providing a second portion of the tensile member with a second reduced thickness that is different from the first reduced thickness, the first tensile member layer and the second tensile member layer being spaced apart from each other at each of the first stitched region and the second stitched region.

2. The chamber of claim 1, wherein the chamber includes an area of reduced thickness at the first stitched region and at the second stitched region relative to adjacent portions of the chamber.

3. The chamber of claim 1, further comprising a third stitched region disposed between the first chamber barrier layer and the second chamber barrier layer and having a third thickness that is different from the first thickness and the second thickness.

4. The chamber of claim 3, wherein a distance between the first tensile member layer and the second tensile member layer is different at each of the first stitched region, the second stitched region, and the third stitched region.

5. The chamber of claim 3, wherein the first stitched region and the second stitched region cooperate to provide the chamber with a depression.

6. The chamber of claim 5, wherein the depression is disposed in a heel region of the chamber.

7. The chamber of claim 3, wherein the second stitched region is disposed between the first stitched region and the third stitched region, a distance between the first tensile member layer and the second tensile member layer at the second stitched region being less than a distance between the first tensile member layer and the second tensile member layer at the first stitched region and greater than a distance between the first tensile member layer and the second tensile member layer at the third stitched region.

8. The chamber of claim 3, wherein the first tensile member layer is in contact with the second tensile member layer at the third stitched region.

9. An article of footwear incorporating the chamber of claim 1.

10. The article of footwear of claim 9, wherein the chamber is incorporated into a sole structure of the article of footwear, the sole structure including at least one flex groove.

11. The article of footwear of claim 10, wherein the first stitched region is aligned with the at least one flex groove.

12. A chamber for receiving a pressurized fluid, the chamber comprising:
a first chamber barrier layer and a second chamber barrier layer bonded to the first chamber barrier layer to define an interior void between the first chamber barrier layer and the second chamber barrier layer;
a tensile member extending between the first chamber barrier layer and the second chamber barrier layer within the interior void and including a first tensile member layer attached to the first chamber barrier layer, a second tensile member layer attached to the second chamber barrier layer, and a plurality of tethers extending between the first tensile member layer and the second tensile member layer;
first stitching attached to the first tensile member layer and to the second tensile member layer to form a first stitched region disposed between the first chamber barrier layer and the second chamber barrier layer, the first stitched region providing an area of the chamber with a first reduced thickness relative to adjacent portions of the chamber; and
second stitching attached to the first tensile member layer and to the second tensile member layer to form a second stitched region disposed between the first chamber barrier layer and the second chamber barrier layer, the second stitched region providing an area of the chamber with a second reduced thickness relative to adjacent portions of the chamber that is different than the first reduced thickness.

13. The chamber of claim 12, wherein the tensile member includes a different thickness at the first stitched region than at the second stitched region.

14. The chamber of claim 12, wherein the first stitched region and the second stitched region cooperate to provide the chamber with a depression.

15. The chamber of claim 14, wherein the depression is disposed in a heel region of the chamber.

16. The chamber of claim 12, wherein the first tensile member layer is in contact with the second tensile member layer at one of the first stitched region and the second stitched region.

17. The chamber of claim 12, wherein the first tensile member layer is spaced apart from the second tensile member layer at the first stitched region and at the second stitched region.

18. An article of footwear incorporating the chamber of claim 12.

19. The chamber of claim 12, wherein the tensile member further includes a first thermoplastic layer disposed adjacent to the first tensile member layer and a second thermoplastic layer disposed adjacent to the second tensile member layer.

20. The chamber of claim 19, wherein the first stitching and the second stitching are attached to the first thermoplastic layer and the second thermoplastic layer.

* * * * *